US012754125B2

(12) United States Patent
Zou et al.

(10) Patent No.: US 12,754,125 B2
(45) Date of Patent: Oct. 6, 2026

(54) METHODS FOR DETERMINING A PHOTODETECTOR GAIN CORRECTION FACTOR FOR OPTICAL SIGNALS IN A FLOW CYTOMETER

(71) Applicant: Becton, Dickinson and Company, Franklin Lakes, NJ (US)

(72) Inventors: Jizuo Zou, San Jose, CA (US); Keegan Owsley, Campbell, CA (US); Matthew Bahr, San Jose, CA (US)

(73) Assignee: Augusta SpinCo Corporation, Milford, MA (US)

( * ) Notice: Subject to any disclaimer, the term of this patent is extended or adjusted under 35 U.S.C. 154(b) by 49 days.

(21) Appl. No.: 17/849,274

(22) Filed: Jun. 24, 2022

(65) Prior Publication Data

US 2023/0022846 A1 Jan. 26, 2023

Related U.S. Application Data

(60) Provisional application No. 63/221,277, filed on Jul. 13, 2021.

(51) Int. Cl.
*G01N 15/1429* (2024.01)
*G01N 15/10* (2024.01)
(Continued)

(52) U.S. Cl.
CPC ..... *G01N 15/1429* (2013.01); *G01N 15/1434* (2013.01); *G01N 2015/1006* (2013.01); *G01N 15/149* (2024.01)

(58) Field of Classification Search
CPC ........... G01N 15/1429; G01N 15/1434; G01N 2015/1006; G01N 2015/149; G01N 15/1459
See application file for complete search history.

(56) References Cited

U.S. PATENT DOCUMENTS 5,270,548 A * 12/1993 Steinkamp ......... G01N 21/6408 250/461.1
6,016,194 A 1/2000 Girvin et al.
(Continued)

FOREIGN PATENT DOCUMENTS

WO WO2021225736 A1 11/2021

OTHER PUBLICATIONS

Daniel M. Kalb et al., "Line Focused Optical Excitation of Parallel Acoustic Focused Sample Streams for High Volumetric and Analytical Rate Flow Cytometry", Aug. 19, 2017, Analytical Chemistry, vol. 89, Issue 18, pp. 9967-9975 (Year: 2017).*
(Continued)

*Primary Examiner* — Michael P LaPage
*Assistant Examiner* — Joshua M Carlson
(74) *Attorney, Agent, or Firm* — Nicholas D. Cervenka; Bret E. Field; Bozicevic, Field & Francis LLP

(57) ABSTRACT

Aspects of the present disclosure include methods for determining a photodetector gain correction factor for application to flow cytometer data. Methods according to certain embodiments include detecting light with a light detection system across a horizontal axis of a flow stream, generating data signals in a photodetector channel (e.g., an imaging photodetector channel) of the light detection system at a plurality of positions across the flow stream and calculating a detector gain correction factor for each position across the flow stream in response to the generated data signals. Methods also include applying a detector gain correction factor to data signals from a photodetector channel (e.g., non-imaging photodetector channels) to generate adjusted signal intensities. Systems (e.g., particle analyzers) having a light source and a light detection system that includes a photodetector (e.g., an imaging photodetector) for practicing the subject methods are also described. Non-transitory com-
(Continued)

puter readable storage medium and integrated circuits (e.g., FPGAs) are also provided.

20 Claims, 10 Drawing Sheets

(51) Int. Cl.
*G01N 15/1434* (2024.01)
*G01N 15/149* (2024.01)

(56) References Cited

U.S. PATENT DOCUMENTS

| | | | | |
|---|---|---|---|---|
| 8,154,724 | B2 * | 4/2012 | Mitchell | G01N 15/1463 356/343 |
| 8,467,055 | B2 | 6/2013 | Imanishi et al. | |
| 8,731,860 | B2 * | 5/2014 | Charles | G01N 21/53 356/243.2 |
| 9,964,968 | B2 * | 5/2018 | Sharpe | G01N 15/1484 |
| 10,960,396 | B2 * | 3/2021 | Perrault, Jr. | B01L 3/502761 |
| 11,965,816 | B2 * | 4/2024 | Wagner | G01N 15/1433 |
| 2002/0030812 | A1 | 3/2002 | Ortyn et al. | |
| 2006/0066840 | A1 | 3/2006 | Fritz | |
| 2007/0194244 | A1 | 8/2007 | Adams et al. | |
| 2008/0019584 | A1 * | 1/2008 | Lindberg | G06V 20/693 382/134 |
| 2008/0087068 | A1 | 4/2008 | Roth et al. | |
| 2011/0019663 | A1 | 1/2011 | Wu et al. | |
| 2011/0196637 | A1 | 8/2011 | Sharpe et al. | |
| 2013/0080082 | A1 * | 3/2013 | Howes | G01N 15/14 702/100 |
| 2013/0214176 | A1 * | 8/2013 | Graves | G01N 15/1434 348/335 |
| 2014/0336062 | A1 * | 11/2014 | Graves | G01N 15/1404 506/7 |
| 2019/0234863 | A1 | 8/2019 | Diebold et al. | |
| 2020/0132586 | A1 * | 4/2020 | Johnson | G01N 15/1404 |
| 2020/0182772 | A1 | 6/2020 | Umetsu et al. | |
| 2020/0376488 | A1 * | 12/2020 | Wu | G01N 21/17 |

OTHER PUBLICATIONS

Kamentsky, et al., "Microscope-Based multiparameter laser scanning cytometer yielding data comparable to flow cytometry data", Cytometry: The Journal of the International Society for Analytical Cytology, 1991, vol. 12, pp. 381-387.

* cited by examiner

METHODS FOR DETERMINING A PHOTODETECTOR GAIN CORRECTION FACTOR FOR OPTICAL SIGNALS IN A FLOW CYTOMETER

CROSS-REFERENCE TO RELATED APPLICATIONS

Pursuant to 35 U.S.C. § 119 (e), this application claims priority to the filing date of U.S. Provisional Patent Application Ser. No. 63/221,277 filed Jul. 13, 2021; the disclosure of which application is incorporated herein by reference in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. A flow cytometer includes a photo-detection system made up of the optics, photodetectors and electronics that enable efficient detection of optical signals and its conversion to corresponding electric signals. The electronic signals are processed to obtain parameters that a user can utilize to perform desired analysis. A flow cytometer includes different types of photodetectors to detect a fluorescent signal. When an optical signal (emerging from the fluorescent sample being analyzed in the flow cytometer) is incident on the photodetectors, an electrical signal is produced at its output which is proportional to the incident optical signal. The gain of a photodetector is determined from the ratio of the output signal to the input signal. The gain of a photodetector can be used to control the operating range of detection by the photodetector, such as to ensure that sample fluorescence shows up in the operating range of the photodetector with a high degree of confidence.

Typically, the gain of a photodetector is positively correlated to voltage such that the gain of the photodetector can be controlled by modulating the voltage applied to the photodetector. However, this correlation is complicated by numerous parameters including the type of the photodetector, wavelength of incident light as well as temperature. In addition, misalignment or aberrations in optical components of a flow cytometer or mechano-optical drift can lead to variations in signal intensities from photodetectors. Different laser beams used to irradiate a sample can have large variations in beam profile across a flow stream core width and laser beam intensity profile can also change over time due to laser drift and environmental changes. This variation is not acceptable in a calibrated and functioning flow cytometer.

SUMMARY

Aspects of the present disclosure include methods for determining a photodetector gain correction factor for application to flow cytometer data. Methods according to certain embodiments include detecting light with a light detection system across a horizontal axis of a flow stream, generating data signals in a photodetector channel (e.g., an imaging photodetector channel) of the light detection system at a plurality of positions across the flow stream and calculating a detector gain correction factor for each position across the flow stream in response to the generated data signals. Methods also include applying a detector gain correction factor to data signals from a photodetector channel (e.g., non-imaging photodetector channels) to generate adjusted signal intensities. Systems (e.g., particle analyzers) having a light source and a light detection system that includes a photodetector (e.g., an imaging photodetector) for practicing the subject methods are also described. Non-transitory computer readable storage medium and integrated circuits (e.g., FPGAs) are also provided.

In practicing the subject methods, light is detected across a horizontal axis of a flow stream. In some instances, light is detected at a plurality of positions across the flow stream. In certain instances, light is simultaneously detected at the plurality of positions across the flow stream. In some embodiments, the data signals are generated in the imaging photodetector channel at a plurality of positions across the flow stream. In certain embodiments, data signals are generated in an imaging photodetector channel of the light detection system in response to the light detected across the flow stream. In some embodiments, the data signals are generated in the imaging photodetector channel at a plurality of pixel locations across the flow stream. Data signals may be generated at 25 pixel locations or more, such as 100 pixel locations or more and including at 250 pixel locations or more. In some instances, the intensity of the data signals is determined at each pixel location. In certain instances, the method includes determining the peak pulse amplitude at each pixel location based on the general data signals. In certain instances, the method includes determining a pulse area of the generated data signal at each pixel location. In some embodiments, the light detection system includes a photodetector optically coupled to one or more slits. In some instances, the data signals are generated in a plurality of photodetector channels for each position across the flow stream. In certain instances, the light detection system includes a photodetector optically coupled to a slit having a plurality of openings. In certain instances, the data signals are generated in a plurality of photodetector channels in response to light detected between each of the plurality of openings of the slit.

In some embodiments, the methods include determining a detector gain correction factor for a plurality of positions across the flow stream, such as by using the calculated gain correction factor from the imaging detector channel at each pixel location. In some instances, the detector gain correction factor is an adjustment to the signal intensity at each pixel location such that the intensity variation between data signals across the flow stream is 5% or less, such as 3% or less. In other instances, the detector gain correction factor is an adjustment to the peak pulse amplitude at each pixel location such that the variation between the peak pulse amplitudes across the flow stream is 5% or less, such as 3% or less. In other instances, the detector gain correction factor is an adjustment to the pulse area of the generated data signal at each pixel location such that the variation between the pulse areas across the flow stream is 5% or less, such as 3% or less. In certain embodiments, methods include determining the variation in signal intensity between the pixel locations across the flow stream, such as by calculating a robust coefficient of variation (rCV) based on the determined data signal intensity at each pixel location.

In some embodiments, the methods include applying detector gain correction factors to data signals generated in one or more non-imaging photodetector channels of the light detection system. In some instances, the detector gain correction factor to data signals generated in one or more non-imaging photodetector channels is calculated based on a gain correction factor from the imaging photodetector channel and signal intensities from the non-imaging photodetector channels. In certain embodiments, methods include generating a detector gain correction factor data file based on the determined detector gain correction factors at each pixel location. In some instances, the data gain correction factor data file includes a table of detector gain correction factors at each pixel location determined from the imaging photodetector channel. In some instances, methods include applying the detector gain correction factor data file to the generated data signals from one or more of the non-imaging photodetector channels of the light detection system.

Aspects of the present disclosure also include systems (e.g., particle analyzer) having a light detection system that includes a photodetector (e.g., an imaging photodetector). In some embodiments, the light detection system is configured to detect light across a horizontal axis of a flow stream and to generate data signals in the photodetector channel at a plurality of positions across the flow stream. In some embodiments, the light detection system includes a photodetector optically coupled to one or more slits, such as a photodetector optically coupled to a slit having a plurality of openings. In some embodiments, the light detection system is configured to generate data signals in a plurality of photodetector channels in response to light detected between each of the plurality of openings of the slit. In certain embodiments, the light detection system is configured to detect light across a horizontal axis of a flow stream and to generate data signals in the imaging photodetector channel at a plurality of pixel locations across the flow stream, such as 100 pixel locations or more and including at 250 pixel locations or more. In some instances, each pixel location corresponds to a position across the horizontal axis of the flow stream. In some embodiments, systems also include a processor having memory operably coupled to the processor where the memory includes instructions stored thereon, which when executed by the processor, cause the processor to calculate a detector gain correction factor for each pixel location across the flow stream in response to the generated data signals. In some embodiments, the system is a particle analyzer. In certain instances, the particle analyzer is incorporated into a flow cytometer, such as where the one or more photodetectors described herein are positioned to detect light from particles in a flow stream.

In some embodiments, the system includes memory having instructions stored thereon, which when executed by the processor, cause the processor to determine the signal intensity at each position across the flow stream (e.g., at each pixel location). In some instances, the memory includes instructions for determining the peak pulse amplitude at each pixel location based on the general data signals. In certain instances, the memory includes instructions for determining a pulse area of the generated data signal at each pixel location. In some embodiments, the memory includes instructions for determining a detector gain correction factor for a plurality of positions across the flow stream, such as by using the calculated gain correction factor from the imaging detector channel at each pixel location. In some instances, the memory include instructions for applying the detector gain correction factor as an adjustment to the signal intensity at each pixel location such that the intensity variation between data signals across the flow stream is 5% or less, such as 3% or less. In other instances, the memory include instructions for applying the detector gain correction factor as an adjustment to the peak pulse amplitude at each pixel location such that the variation between the peak pulse amplitudes across the flow stream is 5% or less, such as 3% or less. In other instances, the memory include instructions for applying the detector gain correction factor as an adjustment to the pulse area of the generated data signal at each pixel location such that the variation between the pulse areas across the flow stream is 5% or less, such as 3% or less. In certain embodiments, the memory includes instructions for generating a detector gain correction factor data file based on the determined detector gain correction factors at each pixel location. In some instances, the detector gain correction factor data file is stored in the memory. In certain embodiments, the system includes memory having instructions stored thereon, which when executed by the processor, cause the processor to determine the variation in signal intensity between the pixel locations across the flow stream, such as by calculating a robust coefficient of variation (rCV) based on the determined data signal intensity at each pixel location.

Aspects of the present disclosure also include non-transitory computer readable storage medium for determining a photodetector gain correction factor for application to flow cytometer data. In embodiments, the non-transitory computer readable storage medium includes algorithm for detecting light with a light detection system across a horizontal axis of a flow stream, algorithm for generating data signals in a photodetector channel (e.g., an imaging photodetector channel) of the light detection system at a plurality of positions (e.g., pixel locations) across the flow stream and algorithm for calculating a detector gain correction factor for each position (e.g., pixel location) across the flow stream in response to the generated data signals. In some instances, the non-transitory computer readable storage medium includes algorithm for simultaneously detecting light at a plurality of positions across the flow stream.

In certain embodiments, the non-transitory computer readable storage medium includes an algorithm for determining an intensity of the generated data signal at each pixel location. In other embodiments, the non-transitory computer readable storage medium includes algorithm for determining a peak pulse amplitude at each pixel location based on the generated data signals. In other embodiments, the non-transitory computer readable storage medium includes algorithm for determining a pulse area of the generated data signal at each pixel location.

In some embodiments, the non-transitory computer readable storage medium includes algorithm for applying detector gain correction factors to data signals generated in one or more non-imaging photodetector channels of the light detection system. In some instances, the non-transitory computer readable storage medium includes algorithm for calculating gain correction factors for data signals generated in one or more non-imaging photodetector channels based on gain correction factors from the imaging photodetector channel and signal intensities from the non-imaging photodetector channels. In some instances, the non-transitory computer readable storage medium includes algorithm for applying an adjustment to the signal intensity at each pixel location such that the intensity variation between data signals across the flow stream is 5% or less, such as 3% or less. In some instances, the non-transitory computer readable storage medium includes algorithm for applying an adjustment to the peak pulse amplitude at each pixel location such that the variation between the peak pulse amplitudes across the flow stream is 5% or less, such as 3% or less. In some instances, the non-transitory computer readable storage medium includes algorithm for applying an adjustment to the pulse area of the generated data signal at each pixel location such that the variation between the pulse areas across the flow stream is 5% or less, such as 3% or less. In certain instances, the non-transitory computer readable storage medium includes algorithm for determining the variation in signal intensity between the pixel locations across the flow stream, such as by calculating a robust coefficient of variation (rCV) based on the determined data signal intensity at each pixel location. In certain embodiments, the non-transitory computer readable storage medium includes a detector gain correction factor data file based on the determined detector gain correction factors that is applied to the data signals at each pixel location. In some instances, the data gain correction factor data file is stored in the non-transitory computer readable storage medium as a table of detector gain correction factors at each pixel location.

Aspects of the present disclosure also include an integrated circuit programmed for processing flow cytometer data. In embodiments, the integrated circuit includes programming for applying a detector gain correction factor to data signals from a photodetector channel of a light detection system. In some instances, the integrated circuit is a field programmable gated array (FPGA). In some instances, the integrated circuit includes an application specific integrated circuit (ASIC). In some instances, the integrated circuit includes a complex programmable logic device (CPLD). In some embodiments, the integrated circuit includes programming for applying detector gain correction factors to data signal for each position (e.g., pixel location) across the flow stream from a detector gain correction factor data file.

In some embodiments, the integrated circuit includes programming for applying detector gain correction factors to data signals generated in one or more non-imaging photodetector channels of the light detection system. In some instances, the integrated circuit includes programming for calculating gain correction factors for data signals generated in one or more non-imaging photodetector channels based on a gain correction factor from the imaging photodetector channel and signal intensities from the non-imaging photodetector channels. In some instances, the integrated circuit includes programming for applying an adjustment to the signal intensity at each pixel location such that the intensity variation between data signals across the flow stream is 5% or less, such as 3% or less. In some instances, the integrated circuit includes programming for applying an adjustment to the peak pulse amplitude at each pixel location such that the variation between the peak pulse amplitudes across the flow stream is 5% or less, such as 3% or less. In some instances, the integrated circuit includes programming for applying an adjustment to the pulse area of the generated data signal at each pixel location such that the variation between the pulse areas across the flow stream is 5% or less, such as 3% or less. In certain embodiments, the integrated circuit includes programming for applying the detector gain correction factors at each pixel location from a detector gain correction factor data file. In some instances, the data gain correction factor data file is programmed into the integrated circuit as a table of detector gain correction factors at each pixel location.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
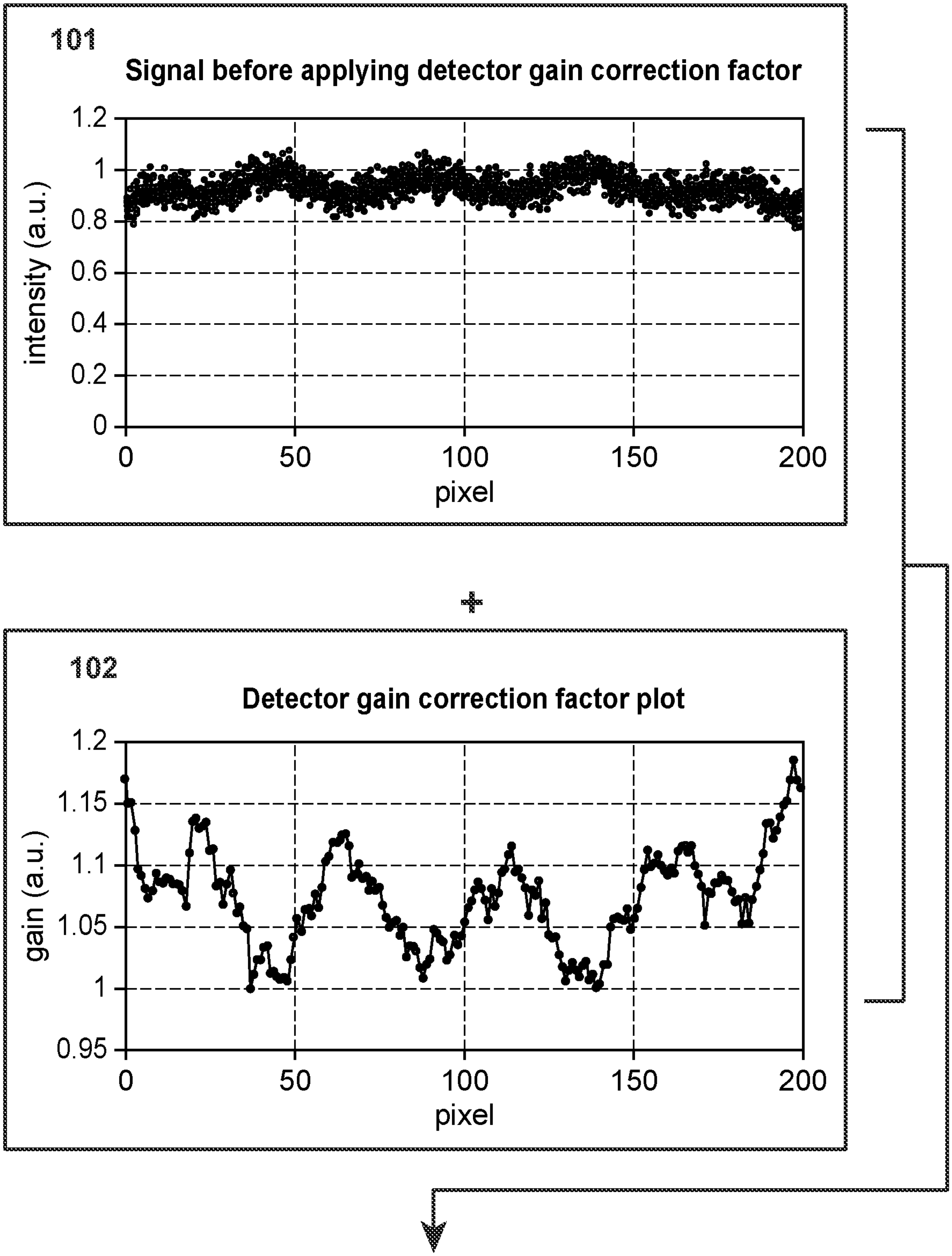
FIG. 1 depicts adjusting data signals from a photodetector with a detector gain correction factor according to certain embodiments.
Figure 1:
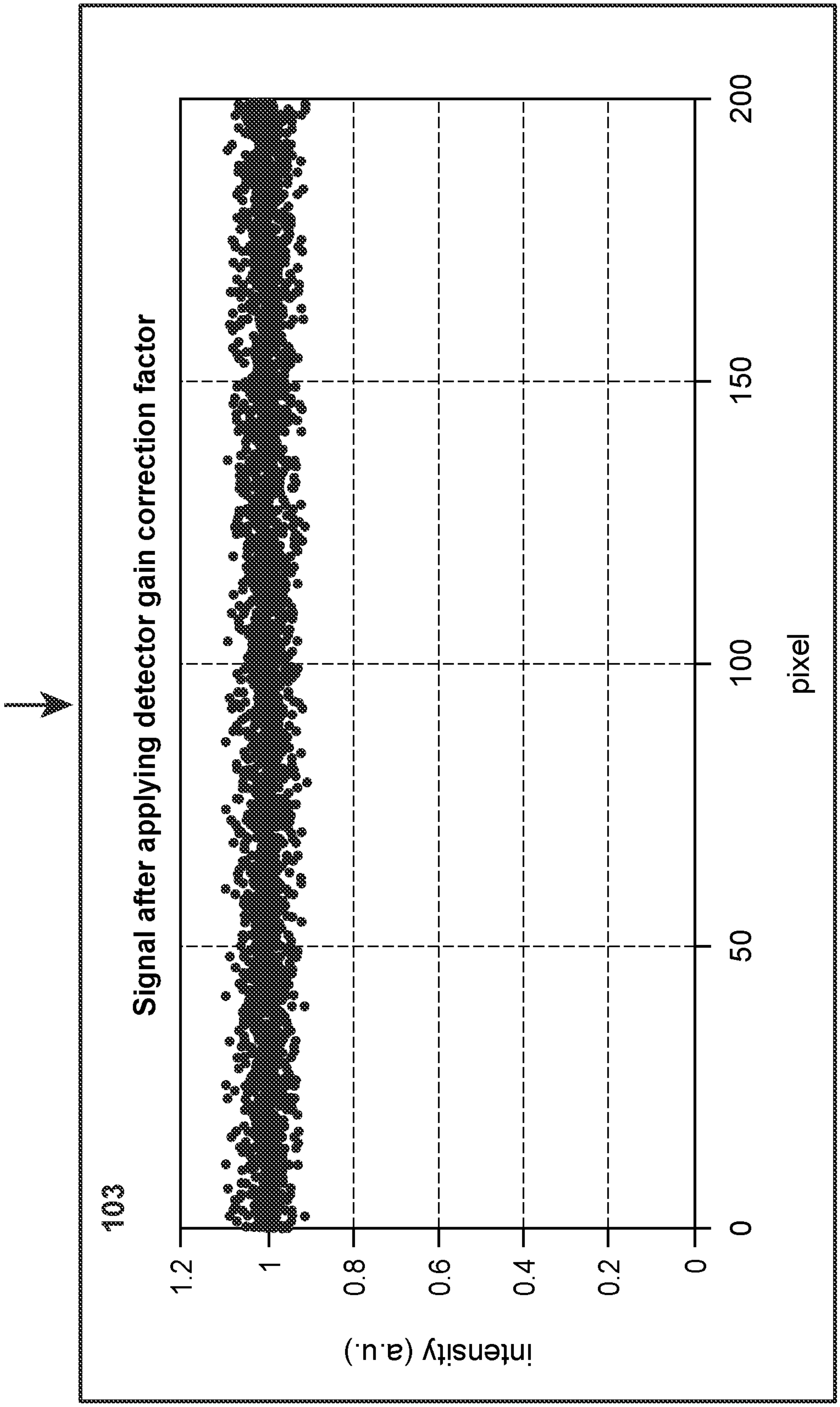

Aspects of the present disclosure include methods for determining a photodetector gain correction factor for application to flow cytometer data. Methods according to certain embodiments include detecting light with a light detection system across a horizontal axis of a flow stream, generating data signals in a photodetector channel (e.g., an imaging photodetector channel) of the light detection system at a plurality of positions across the flow stream and calculating a detector gain correction factor for each position across the flow stream in response to the generated data signals. Methods also include applying a detector gain correction factor to data signals from a photodetector channel (e.g., non-imaging photodetector channels) to generate adjusted signal intensities. Systems (e.g., particle analyzers) having a light source and a light detection system that includes a photodetector (e.g., an imaging photodetector) for practicing the subject methods are also described. Non-transitory computer readable storage medium and integrated circuits (e.g., FPGAs) are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range.

Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for determining a photodetector gain correction factor for application to flow cytometer data. In further describing embodiments of the disclosure, methods for detecting light with a light detection system across a horizontal axis of a flow stream, generating data signals in a photodetector channel of the light detection system at a plurality of positions across the flow stream and calculating a detector gain correction factor for each position across the flow stream in response to the generated data signals are first described in greater detail. Next, systems that include a light source and a light detection system having a photodetector for practicing the subject methods are described. Non-transitory computer readable storage mediums and integrated circuits are also described.

Methods for Determining a Photodetector Gain Correction Factor

Aspects of the present disclosure include methods for determining a photodetector gain correction factor for application to flow cytometer data. In some embodiments, methods include calculating a detector gain correction factor for a plurality of positions across a horizontal axis of a flow stream. In some instances, the subject methods provide for reduced photodetector signal intensity variation across a flow stream when the calculated detector gain correction factor is applied to data signals generated in response to detected light. In some instances, the detector gain correction factor described herein provides for a reduced robust coefficient of variation (rCV) when the calculated detector gain correction factor is applied to data signals generated in response to detected light, such as where the rCV is reduced by 5% or more, such as by 10% or more, such as by 25% or more, such as by 50% or more, such as by 75% or more, such as by 90% or more and including by 99% or more. In certain instances, applying the calculated detector gain correction factor is sufficient to reduce or eliminate photodetector signal intensity variation caused by misaligned optical components in a particle analyzer or in a flow cytometer, such as where one or more lasers of the particle analyzer or flow cytometer are misaligned. In other instances, applying the calculated detector gain correction factor is sufficient to reduce or eliminate photodetector signal intensity variation caused by irradiation of the flow stream with a light source (e.g., laser) having a Gaussian or super Gaussian beam profile. In certain embodiments, the subject methods provide for for an increased signal-to-noise ratio of the light detection system, such as where the signal-to-noise ratio of the light detection system is increased by 5% or more, such as by 10% or more, such as by 25% or more, such as by 50% or more, such as by 75% or more, such as by 90% or more and including by 99% or more. In certain instances, the subject methods increase the signal-to-noise ratio by 2-fold or more, such as by 3-fold or more, such as by 4-fold or more, such as by 5-fold or more and including by 10-fold or more. In certain embodiments, methods of the present disclosure are sufficient to broaden the range of intensity detection and quantitation by 2 fold or greater, such as by 3 fold or greater, such as by 5 fold or greater, such as by 10 fold or greater, such as by 25 fold or greater, such as by 50 fold or greater and including by 100 fold or greater.

In practicing the subject methods, light is detected from a horizontal axis of a flow stream with a light detection system. As described in greater detail below, in some embodiments light from the flow stream is detected in an imaging photodetector channel at a plurality of positions across the flow stream. In some embodiments, methods include irradiating a particle propagating through the flow stream across an interrogation region of the flow stream of 5 μm or more, such as 10 μm or more, such as 15 μm or more, such as 20 μm or more, such as 25 μm or more, such as 50 μm or more, such as 75 μm or more, such as 100 μm or more, such as 250 μm or more, such as 500 μm or more, such as 750 µm or more, such as for example across an interrogation region of 1 mm or more, such as 2 mm or more, such as 3 mm or more, such as 4 mm or more, such as 5 mm or more, such as 6 mm or more, such as 7 mm or more, such as 8 mm or more, such as 9 mm or more and including 10 mm or more. In some instances, the particle irradiated in the flow stream is a multi-spectral particle, such as a bead having one or more fluorophores (described in greater detail below).

In some embodiments, the methods include irradiating the particle in the flow stream with a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, methods may include irradiating the particle in the flow stream with a continuous light source that provides for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In other embodiments, the methods include irradiating the particle propagating through the flow stream with a pulsed light source, such as where light is emitted at predetermined time intervals, each time interval having a predetermined irradiation duration (i.e., pulse width). In certain embodiments, methods include irradiating the particle with the pulsed light source in each interrogation region of the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

The flow stream may be irradiated with any convenient light source and may include laser and non-laser light sources (e.g., light emitting diodes). In certain embodiments, methods include irradiating the particle with a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, $ytterbium_2O_3$ laser or cerium doped lasers and combinations thereof.

In some embodiments, the light source is outputs a specific wavelength such as from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The flow stream may be irradiated by the light source from any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the flow stream may be at any suitable angle such as at an angle ranging from 10° to 90°, such as from 15° to 85°, such as from 20° to 80°, such as from 25° to 75° and including from 30° to 60°, for example at a 90° angle.

Light from a plurality of different positions across a horizontal axis of the flow stream is detected. In embodiments, methods may include detecting light at 10 positions (e.g., segments of a predetermined length) or more across the flow stream, such as 25 positions or more, such as 50 positions or more, such as 75 positions or more, such as 100 positions or more, such as 150 positions or more, such as 200 positions or more, such as 250 positions or more and including 500 positions or more across the horizontal axis of the flow stream. In some embodiments, light is detected simultaneously from each position across the flow stream. In some embodiments, light from the flow stream is detected with an imaging photodetector, such as where the imaging photodetector detects light simultaneously across the flow stream in a plurality of pixel locations. For example, light from the flow stream may be detected with an imaging photodetector at 10 pixel locations or more across the flow stream, such as 25 pixel locations or more, such as 50 pixel locations or more, such as 75 pixel locations or more, such as 100 pixel locations or more, such as 150 pixel locations or more, such as 200 pixel locations or more, such as 250 pixel locations or more and including 500 pixel locations or more across the horizontal axis of the flow stream. In some instances, each pixel location corresponds to a different position across the horizontal axis of the flow stream.

Photodetectors may be any convenient light detecting protocol, including but not limited to photosensors or photodetectors, such as active-pixel sensors (APSs), avalanche photodiodes (APDs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In certain embodiments, the light detection system includes one or more photodetectors that are optically coupled to a slit. Depending on the size of the active detecting surface of the photodetector, slits according to certain instances have a rectangular (or other polygonal shape) opening having a width of from 0.01 mm to 2 mm, such as from 0.1 mm to 1.9 mm, such as from 0.2 mm to 1.8 mm, such as from 0.3 mm to 1.7 mm, such as from 0.4 mm to 1.6 mm, and including a width of from 0.5 mm to 1.5 mm and a length of from 0.01 mm to 2 mm, such as from 0.1 mm to 1.9 mm, such as from 0.2 mm to 1.8 mm, such as from 0.3 mm to 1.7 mm, such as from 0.4 mm to 1.6 mm, and including a length of from 0.5 mm to 1.5 mm. In certain instances, the width of the slit is 1 mm or less, such as 0.9 mm or less, such as 0.8 mm or less, such as 0.7 mm or less, such as 0.6 mm or less, such as 0.5 mm or less and including a width that is 0.4 mm or less. In certain embodiments, the slit includes an opening which extends along the longitudinal axis of the flow stream. In certain instances, the light detection system includes a photodetector that is optically coupled to a slit having a plurality of openings, such as a slit having 2 or more openings, such as 3 or more openings, such as 4 or more openings, such as 5 or more openings, such as 6 or more openings, such as 7 or more openings, such as 8 or more openings, such as 9 or more openings and including a slit having 10 or more openings. In certain embodiments, the light detection system is configured to generate data signals in a plurality of photodetector channels in response to light detected between each of the plurality of openings of the slit.

Light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from across the flow stream may be taken one or more times during each discrete time interval, such as 2 or more times, such as 3 or more times, such as 5 or more times and including 10 or more times. In certain embodiments, the light from the flow stream is measured by the photodetector 2 or more times, with the data in certain instances being averaged.

In practicing the subject methods according to certain embodiments, data signals are generated in an imaging photodetector channel of the light detection system at a plurality of pixel locations across the flow stream, such as at 10 pixel locations or more across the flow stream, such as at 25 pixel locations or more, such as at 50 pixel locations or more, such as at 75 pixel locations or more, such as at 100 pixel locations or more, such as at 150 pixel locations or more, such as at 200 pixel locations or more, such as at 250 pixel locations or more and including at 500 pixel locations or more across the horizontal axis of the flow stream. In some instances, methods include determining the intensity of the data signals are each pixel location. In some instances, the peak amplitude of the generated data signals at each pixel location are determined. In some instances, the pulse area of the generated data signals at each pixel location are determined. In certain instances, methods include plotting one or more of the signal intensity, peak amplitude and pulse area of the generated data signals at each pixel location. In some embodiments, the variation of the signal intensity, peak amplitude or pulse area of the generated data signals across the horizontal axis of the flow stream is assessed. In certain embodiments, methods include calculating a robust coefficient of variation of one or more of the signal intensity, peak amplitude or pulse area of the generated data signals across the flow stream. For example, the robust coefficient of variation of the data signal intensity may be calculated based on the plotted data signals at each pixel location.

A detector gain correction factor is calculated for each pixel location in the imaging photodetector channel based on the generated data signals across the flow stream. In some embodiments, the detector gain correction factor is calculated by determining an adjustment to the signal intensity at each pixel location such that there is little to no intensity variation between data signals across the flow stream. In other words, when the detector gain correction factor is applied to data signals at each pixel location the data signal intensity exhibits uniformity across the horizontal axis of the flow stream. For example, the detector gain correction factor may be an adjustment to the signal intensity at each pixel location such that the intensity variation between data signals across the flow stream is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less.

In some embodiments, the detector gain correction factor at one or more pixel locations is an additive adjustment, where the detector gain correction factor increases the data signal intensity at the one or more pixel locations. In other embodiments, the detector gain correction factor at one or more pixel locations is a subtractive adjustment, where the detector gain correction factor decreases the data signal intensity at the one or more pixel locations. In some embodiments, applying the detection gain correction factor to the generated data signals in the imaging photodetector channel at each pixel location is sufficient to reduce the robust coefficient of variation in the data signal intensity across the flow stream by 0.1% or more, such as by 0.2% or more, such as by 0.3% or more, such as by 0.4% or more, such as by 0.5% or more, such as by 0.6% or more, such as by 0.7% or more, such as by 0.8% or more, such as by 0.9% or more, such as by 1.0% or more, such as by 1.5% or more, such as by 2.0% or more and including reducing the robust coefficient of variation in the data signal intensity across the flow stream by 2.5% or more.

FIG. 1 depicts adjusting data signals from a photodetector with a detector gain correction factor according to certain embodiments. As shown in 101, data signals from a photodetector exhibit non-uniform intensity across a plurality of pixel locations. This non-uniform photodetector signal intensity can be caused in some instances by misalignment or irregularities in the laser light used to irradiate the flow stream. For example, the laser light used to irradiate the flow stream may have an irregular flat-top beam profile generated by a cylindrical lens (e.g., a Powell lens) or may be misaligned with one or more optical components. In certain instances, the non-uniform photodetector signal intensity may be caused by using laser light having a Gaussian or super Gaussian beam profile to irradiate the flow stream. A detector gain correction factor is calculated as described herein for each pixel location (e.g., pixels 1-100) based on generated data signals in an imaging photodetector channel. A plot of the detector gain correction factors for each pixel location is shown in 102. Applying the detector gain correction factors of 102 to the data signals of 101 generate the corrected data signals at each pixel location shown in 103. The robust coefficient of variation (rCV) of corrected data signals 103 is reduced by 1.6% (from a rCV of 4.9% for 101 to a rCV of 3.3% for 103) as compared to the data signals of 101.

In some embodiments, methods include applying the determined detector gain correction factors to data signals generated in one or more non-imaging photodetector channels of the light detection system. For example, the determined detector gain correction factors at each pixel location may be applied to data signals generated in 2 or more non-imaging photodetector channels, such as 3 or more, such as 4 or more, such as 8 or more, such as 12 or more, such as 16 or more, such as 24 or more, such as 32 or more, such as 48 or more, such as 64 or more and including in 128 or more non-imaging photodetector channels of the light detection system. In these embodiments, applying the determined detector gain correction factors is sufficient to generate data signals in the non-imaging photodetector channels that exhibit little to no signal intensity variation across the flow stream, such as where intensity variation in the data signals across the flow stream in each non-imaging photodetector channel is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less.

In some embodiments, the detector gain correction factor applied to the data signals from the non-imaging photodetector channel is an additive adjustment, where the detector gain correction factor increases the data signal intensity. In other embodiments, the detector gain correction factor applied to the data signals from the non-imaging photodetector channel is a subtractive adjustment, where the detector gain correction factor decreases the data signal intensity. In certain embodiments, applying the detector gain correction factor to the data signals in the non-imaging photodetector channel is sufficient to reduce the robust coefficient of variation in the non-imaging photodetector data signal intensity across the flow stream by 0.1% or more, such as by 0.2% or more, such as by 0.3% or more, such as by 0.4% or more, such as by 0.5% or more, such as by 0.6% or more, such as by 0.7% or more, such as by 0.8% or more, such as by 0.9% or more, such as by 1.0% or more, such as by 1.5% or more, such as by 2.0% or more and including reducing the robust coefficient of variation in the data signal intensity across the flow stream by 2.5% or more.

Figure 2:
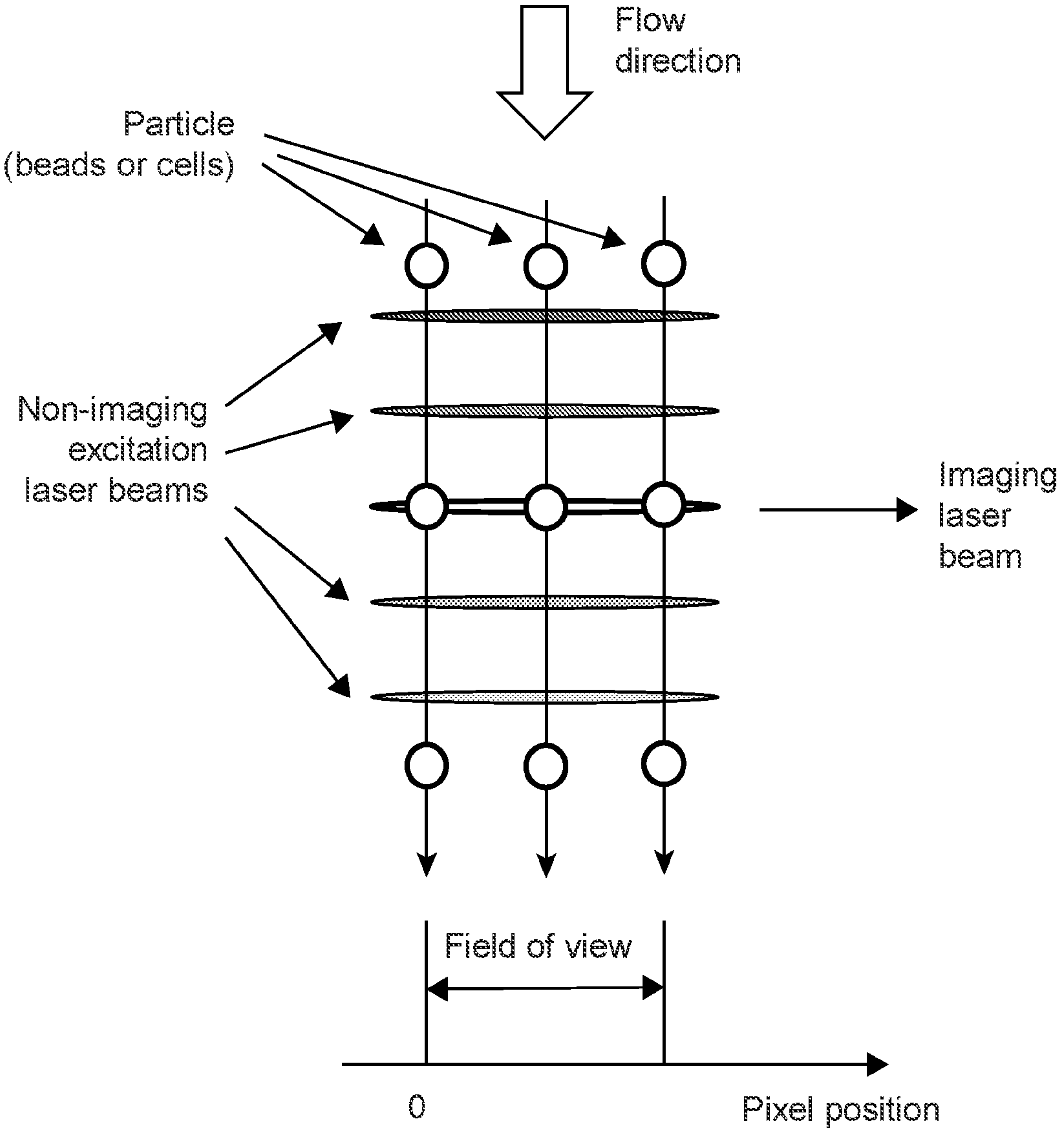
FIG. 2 illustrates applying a detector gain correction factor generated in an imaging photodetector channel to one or more non-imaging photodetector channels according to certain embodiments.

FIG. 2 illustrates applying a detector gain correction factor calculated in an imaging photodetector channel to one or more non-imaging photodetector channels according to certain embodiments. A particle (e.g., a bead or cell) are irradiated with laser light from 5 different laser beams, each across a horizontal axis of the flow stream. An imaging laser beam is used to irradiate across the flow stream. The imaging beam generates imaging signals for the particles. The signals contain pixel position of each particle. A detector gain correction factor is calculated based on the generated data signals at each pixel location in the imaging photodetector channel. Each pixel location in the imaging photodetector channel corresponds to a positions across the horizontal axis of the flow stream. Non-imaging beams generate signals for each particle without pixel position information. When the laser intensity or collection efficiency at each pixel position are different, the collected signal will vary between particles (e.g., causing high rCV). The pixel position from the imaging photodetector channel can be used to perform a detector gain correction to compensate for the variation between particles for both the imaging photodetector channel and non-imaging photodetector channels. To do so, the detector gain correction factors calculated in the imaging photodetector channel are used to calculate detector gain correction factors for applying the data signals generated in one or more of the non-imaging photodetector channels.

In certain embodiments, methods include generating a detector gain correction factor data file based on the determined detector gain correction factors at each pixel location. In some instances, the data gain correction factor data file includes a table of detector gain correction factors at each pixel location determined from the imagining photodetector channel. In some instances, methods include applying the detector gain correction factor data file to one or more sets of data signals, such as data signals stored in memory. As described in greater detail below, the detector gain correction factor data file may be applied to data signals from a photodetector channel with an integrated circuit (e.g., a field programmable gate array) programmed with the detector gain correction factor data file.

Figure 3:
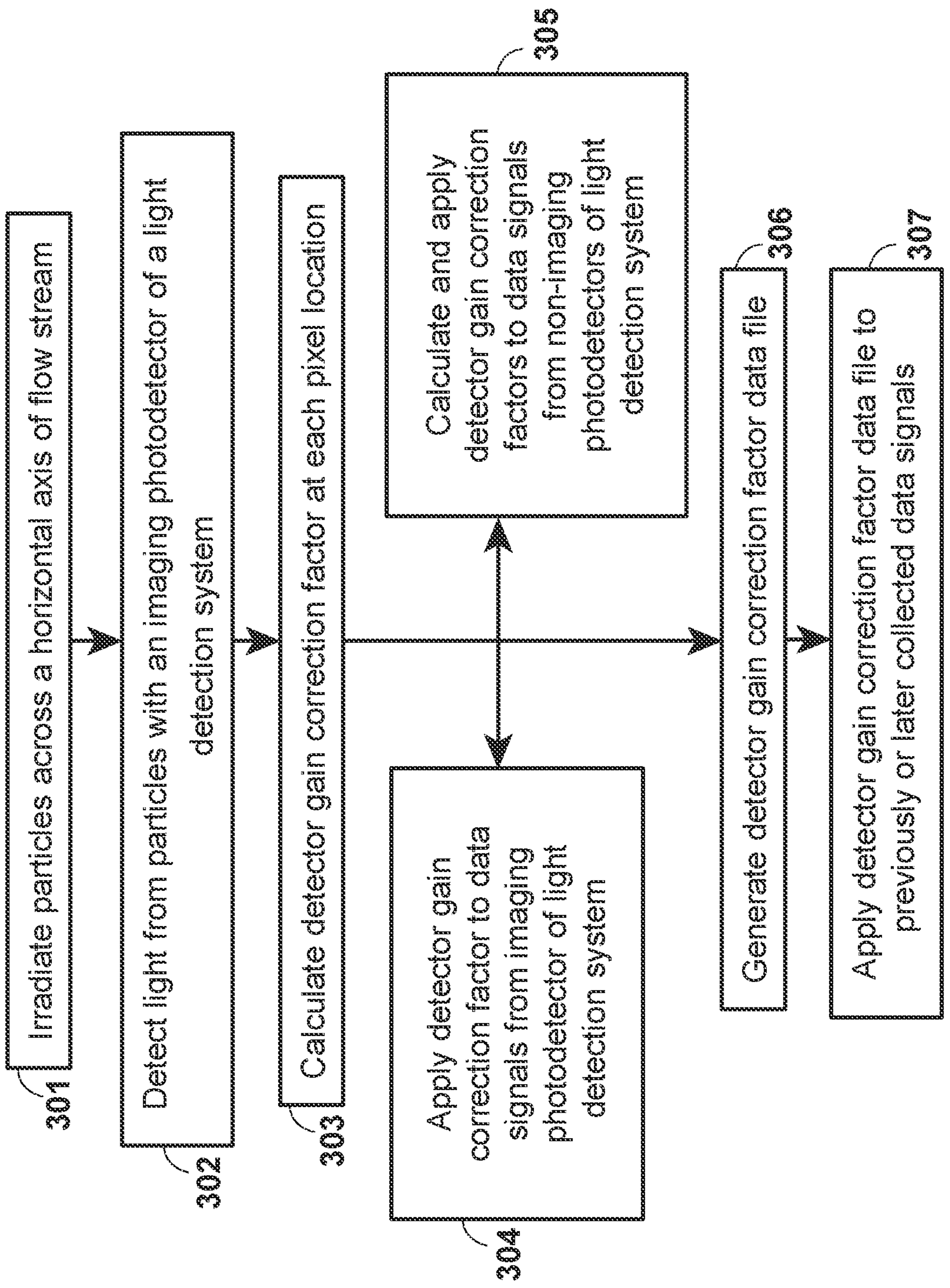
FIG. 3 depicts a flow chart for determining a detector gain correction factor for application to flow cytometer data according to certain embodiments.

FIG. 3 depicts a flow chart for determining a detector gain correction factor for application to flow cytometer data according to certain embodiments. At stop 301, a light source irradiates particles across a horizontal axis of a flow stream. Light from the particles is detected with a light detection system having an imaging photodetector. Data signals from the imaging photodetector channel are generated at step 302 at a plurality of pixel locations across the flow stream. Based on the generated data signals, a detector gain correction factor is calculated at each pixel location at step 303. In certain instances, the gain correction factor at each pixel location in step 303 is calculated to be an adjustment to the signal intensity at each pixel location such that the intensity variation between data signals across the flow stream is 5% or less, such as 3% or less or where the calculated rCV of the data signals in the photodetector channel is reduced by 1% or more, such as by 1.5% or more. At step 304, the gain correction factor is applied to data signals from the imaging photodetector channel to generate data signals from the imaging photodetector at each pixel location that are uniform across the flow stream. At step 305, a gain correction factor is calculated based on the gain correction factor from the imaging photodetector channel and applied to data signals from one or more non-imaging photodetector channels to generate data signals from each non-imaging photodetector that are uniform across the flow stream. In some instances, the calculated gain correction factors at each pixel location is used to generate a detector gain correction factor data file (step 306) which can be applied to previously or later collected data signals (step 307).

Systems for Determining a Photodetector Gain Correction Factor

Aspects of the present disclosure also include systems (e.g., particle analyzer) having a light detection system that includes an imaging photodetector. Systems according to certain embodiments include a light source for irradiating a flow stream and a light detection system configured to detect light across a horizontal axis of the flow stream and to generate data signals in an imaging photodetector channel at a plurality of pixel locations. In some embodiments, the light source is a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In some embodiments, the light source includes one or more pulsed light sources, such as where light is emitted at predetermined time intervals, each time interval having a predetermined irradiation duration (i.e., pulse width). In certain embodiments, the pulsed light source is configured to irradiate the photodetector with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

The light source may include laser and non-laser light sources (e.g., light emitting diodes). In certain embodiments, systems include a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

The light source may be configured to output a specific wavelength, such as from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The light source may be positioned at any suitable distance from the flow stream, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. The light source may be positioned at any suitable angle such as at an angle ranging from 10° to 90°, such as from 15° to 85°, such as from 20° to 80°, such as from 25° to 75° and including from 30° to 60°, for example at a 90° angle.

In embodiments, the light detection system is configured to detect light from a plurality of different positions across the horizontal axis of the flow stream. In some embodiments, the light detection system is configured to detect light across the flow stream at 10 positions (e.g., segments of a predetermined length) or more, such as 25 positions or more, such as 50 positions or more, such as 75 positions or more, such as 100 positions or more, such as 150 positions or more, such as 200 positions or more, such as 250 positions or more and including 500 positions or more across the horizontal axis of the flow stream. In some embodiments, the light detection system is configured to detect light simultaneously from each position across the flow stream. In some embodiments, the light detection system includes an imaging photodetector which detects light simultaneously across the flow stream in a plurality of pixel locations. For example, the imaging photodetector may be configured to detect light from the flow stream at 10 pixel locations or more across the flow stream, such as 25 pixel locations or more, such as 50 pixel locations or more, such as 75 pixel locations or more, such as 100 pixel locations or more, such as 150 pixel locations or more, such as 200 pixel locations or more, such as 250 pixel locations or more and including 500 pixel locations or more across the horizontal axis of the flow stream. In some instances, each pixel location corresponds to a different position across the horizontal axis of the flow stream.

Photodetectors may be any convenient light detecting protocol, including but not limited to photosensors or photodetectors, such as active-pixel sensors (APSs), avalanche photodiodes (APDs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In certain embodiments, the light detection system includes one or more photodetectors that are optically coupled to a slit. Depending on the size of the active detecting surface of the photodetector, slits according to certain instances have a rectangular (or other polygonal shape) opening having a width of from 0.01 mm to 2 mm, such as from 0.1 mm to 1.9 mm, such as from 0.2 mm to 1.8 mm, such as from 0.3 mm to 1.7 mm, such as from 0.4 mm to 1.6 mm, and including a width of from 0.5 mm to 1.5 mm and a length of from 0.01 mm to 2 mm, such as from 0.1 mm to 1.9 mm, such as from 0.2 mm to 1.8 mm, such as from 0.3 mm to 1.7 mm, such as from 0.4 mm to 1.6 mm, and including a length of from 0.5 mm to 1.5 mm. In certain instances, the width of the slit is 1 mm or less, such as 0.9 mm or less, such as 0.8 mm or less, such as 0.7 mm or less, such as 0.6 mm or less, such as 0.5 mm or less and including a width that is 0.4 mm or less. In certain embodiments, the slit includes an opening which extends along the longitudinal axis of the flow stream. In certain instances, the light detection system includes a photodetector that is optically coupled to a slit having a plurality of openings, such as a slit having 2 or more openings, such as 3 or more openings, such as 4 or more openings, such as 5 or more openings, such as 6 or more openings, such as 7 or more openings, such as 8 or more openings, such as 9 or more openings and including a slit having 10 or more openings. In certain embodiments, the light detection system is configured to generate data signals in a plurality of photodetector channels in response to light detected between each of the plurality of openings of the slit.

The photodetectors of the light detection system may be configured to measure light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

The photodetectors may be configured to take measurements of the light from the flow stream one or more times during each discrete time interval, such as 2 or more times, such as 3 or more times, such as 5 or more times and including 10 or more times. In certain embodiments, the light from the flow stream is measured by the photodetector 2 or more times, with the data in certain instances being averaged.

In embodiments, systems include a processor having memory operably coupled to the processor where the memory includes instructions stored thereon, which when executed by the processor, cause the processor to calculate a detector gain correction factor for each pixel location across the flow stream in response to the generated data signals. In some instances, the memory includes instructions to calculate a detector gain correction factor at a plurality of pixel locations across the flow stream, such as at 10 pixel locations or more across the flow stream, such as at 25 pixel locations or more, such as at 50 pixel locations or more, such as at 75 pixel locations or more, such as at 100 pixel locations or more, such as at 150 pixel locations or more, such as at 200 pixel locations or more, such as at 250 pixel locations or more and including at 500 pixel locations or more across the horizontal axis of the flow stream.

In some instances, the memory includes instructions for determining the intensity of the data signals are each pixel location. In some instances, the memory includes instructions for determining the peak amplitude of the generated data signals at each pixel location. In some instances, the memory includes instructions for determining the pulse area of the generated data signals at each pixel location. In certain instances, the memory includes instructions for plotting one or more of the signal intensity, peak amplitude and pulse area of the generated data signals at each pixel location. In some embodiments, the memory includes instructions for assessing the variation of the signal intensity, peak amplitude or pulse area of the generated data signals across the horizontal axis of the flow stream. In certain embodiments, the memory further includes instructions for calculating a robust coefficient of variation of one or more of the signal intensity, peak amplitude or pulse area of the generated data signals across the flow stream. For example, the robust coefficient of variation of the data signal intensity may be calculated based on the plotted data signals at each pixel location.

Systems include a processor having memory operably coupled to the processor where the memory includes instructions stored thereon, which when executed by the processor, cause the processor to calculate a detector gain correction factor for each pixel location in the imaging photodetector channel based on the generated data signals across the flow stream. In some embodiments, the detector gain correction factor is calculated by determining an adjustment to the signal intensity at each pixel location such that there is little to no intensity variation between data signals across the flow stream. For example, the detector gain correction factor may be an adjustment to the signal intensity at each pixel location such that the intensity variation between data signals across the flow stream is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less.

In some embodiments, the detector gain correction factor at one or more pixel locations is an additive adjustment, where the detector gain correction factor increases the data signal intensity at the one or more pixel locations. In other embodiments, the detector gain correction factor at one or more pixel locations is a subtractive adjustment, where the detector gain correction factor decreases the data signal intensity at the one or more pixel locations. In some embodiments, applying the detection gain correction factor to the generated data signals in the imaging photodetector channel at each pixel location is sufficient to reduce the robust coefficient of variation (rCV) in the data signal intensity across the flow stream by 0.1% or more, such as by 0.2% or more, such as by 0.3% or more, such as by 0.4% or more, such as by 0.5% or more, such as by 0.6% or more, such as by 0.7% or more, such as by 0.8% or more, such as by 0.9% or more, such as by 1.0% or more, such as by 1.5% or more, such as by 2.0% or more and including reducing the robust coefficient of variation in the data signal intensity across the flow stream by 2.5% or more.

In some embodiments, the memory includes instructions for applying detector gain correction factors to data signals generated in one or more non-imaging photodetector channels of the light detection system. In some instances, the memory includes instructions for calculating gain correction factors for data signals generated in one or more non-imaging photodetector channels based on gain correction factors from the imaging photodetector channel and signal intensities from the non-imaging photodetector channels. For example, the memory includes instructions for applying detector gain correction factors to data signals generated in 2 or more non-imaging photodetector channels, such as 3 or more, such as 4 or more, such as 8 or more, such as 12 or more, such as 16 or more, such as 24 or more, such as 32 or more, such as 48 or more, such as 64 or more and including in 128 or more non-imaging photodetector channels of the light detection system. In these embodiments, the memory includes instructions for applying the determined detector gain correction factors so as to generate data signals in the non-imaging photodetector channels that exhibit little to no signal intensity variation across the flow stream, such as where intensity variation in the data signals across the flow stream in each non-imaging photodetector channel is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less.

In some embodiments, the detector gain correction factor applied to the data signals from the non-imaging photodetector channel is an additive adjustment, where the detector gain correction factor increases the data signal intensity. In other embodiments, the detector gain correction factor applied to the data signals from the non-imaging photodetector channel is a subtractive adjustment, where the detector gain correction factor decreases the data signal intensity. In certain embodiments, the memory includes instructions for applying the detector gain correction factors to the data signals in the non-imaging photodetector channel so as to reduce the robust coefficient of variation in the non-imaging photodetector data signal intensity across the flow stream by 0.1% or more, such as by 0.2% or more, such as by 0.3% or more, such as by 0.4% or more, such as by 0.5% or more, such as by 0.6% or more, such as by 0.7% or more, such as by 0.8% or more, such as by 0.9% or more, such as by 1.0% or more, such as by 1.5% or more, such as by 2.0% or more and including reducing the robust coefficient of variation in the data signal intensity across the flow stream by 2.5% or more.

In certain embodiments, the memory includes instructions for generating a detector gain correction factor data file based on the determined detector gain correction factors at each pixel location. In some instances, the data gain correction factor data file includes a table of detector gain correction factors at each pixel location determined from the imagining photodetector channel. In some instances, the memory includes instructions for applying the detector gain correction factor data file to one or more stored sets of data signals, such as data signals stored in memory.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/imin or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μt/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 254 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 μL/min (microliter per minute) or more, such as 2 μL/min or more, such as 3 μL/min or more, such as 5 μL/min or more, such as 10 μL/min or more, such as 25 μL/min or more, such as 50 μL/min or more, such as 75 μL/min or more, such as 100 μL/min or more, such as 250 μL/min or more, such as 500 μL/min or more, such as 750 μL/min or more and including 1000 μL/min or more. For example, the system may include a pump that is configured to flow sample through the flow cell at a rate that ranges from 1 μL/min to 500 μL/min, such as from 1 μL/min to 250 μL/min, such as from 1 μL/min to 100 μL/min, such as from 2 μL/min to 90 μL/min, such as from 3 μL/min to 80 μL/min, such as from 4 μL/min to 70 μL/min, such as from 5 μL/min to 60 μL/min and including rom 10 μL/min to 50 μL/min. In certain embodiments, the flow rate of the flow stream is from 5 μL/min to 6 μL/min. In certain embodiments, light detection systems having the plurality of photodetectors as described above are part of or positioned in a particle analyzer, such as a particle sorter. In certain embodiments, the subject systems are flow cytometric systems that includes the photodiode and amplifier component as part of a light detection system for detecting light emitted by a sample in a flow stream. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry,* 3rd ed., Wiley-Liss (1995); Virgo, et al. (2012) *Ann Clin Biochem.* January; 49(pt 1):17-28; Linden, et. al., *Semin Throm Hemost.* 2004 October; 30(5): 502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g, cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 4A:
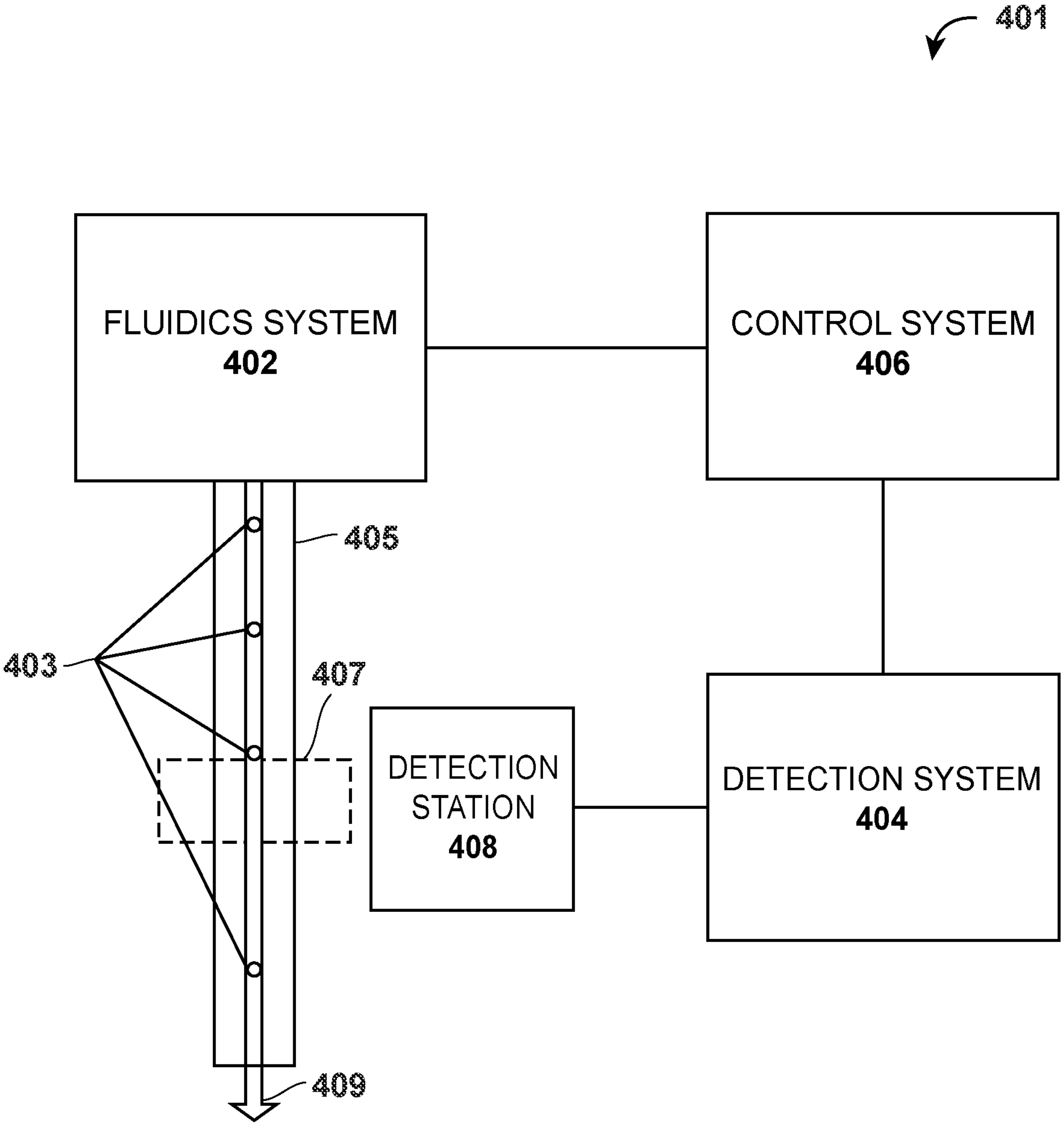
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
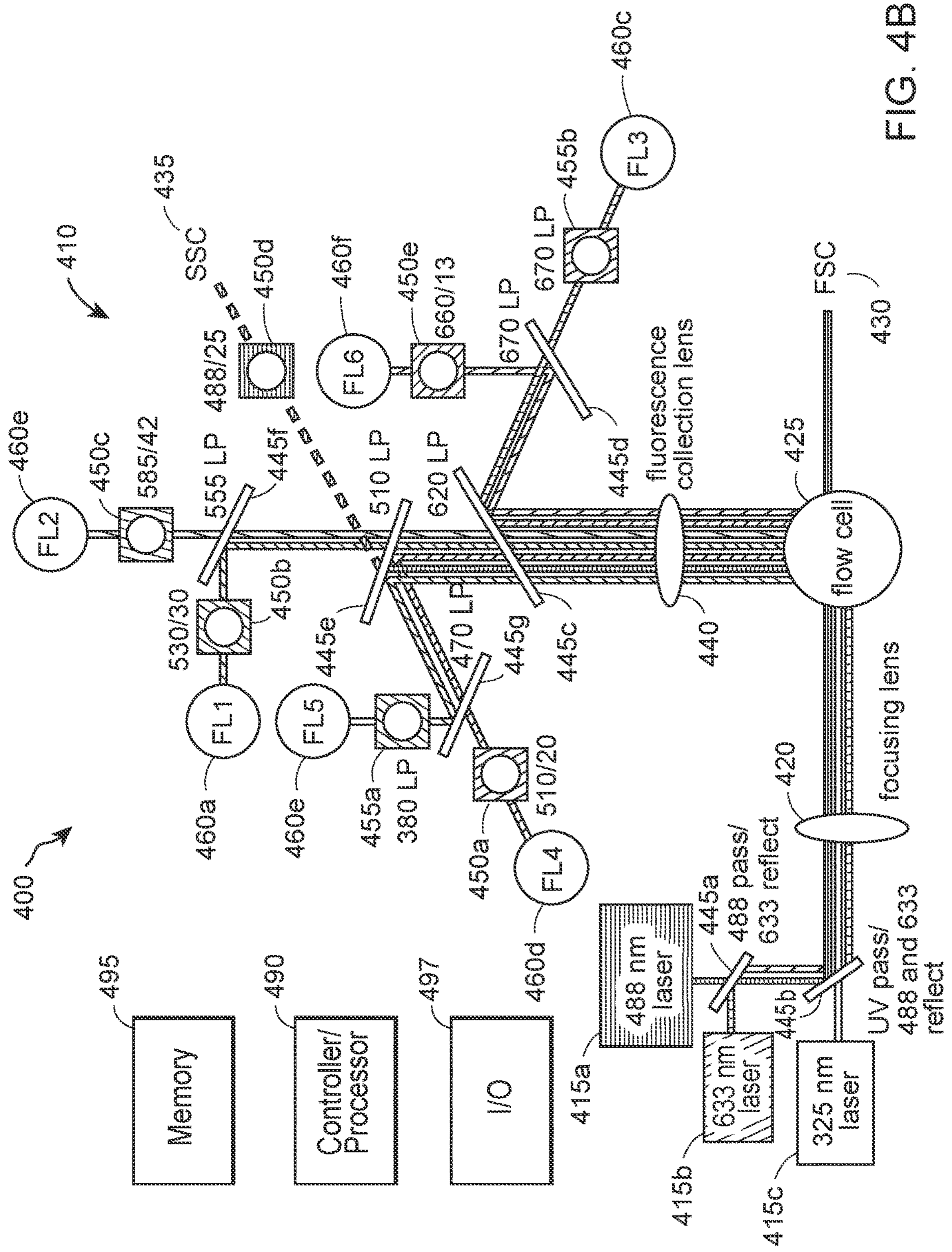
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415*a*-415*c*, a focusing lens 420, a flow chamber 425, a forward scatter detector 430, a side scatter detector 435, a fluorescence collection lens 440, one or more beam splitters 445*a*-445*g*, one or more bandpass filters 450*a*-450*e*, one or more longpass ("LP") filters 455*a*-455*b*, and one or more fluorescent detectors 460*a*-460*f*.

The excitation lasers 115*a-c* emit light in the form of a laser beam. The wavelengths of the laser beams emitted from excitation lasers 415*a*-415*c* are 488 nm, 633 nm, and 325 nm, respectively, in the example system of FIG. 4B. The laser beams are first directed through one or more of beam splitters 445*a* and 445*b*. Beam splitter 445*a* transmits light at 488 nm and reflects light at 633 nm. Beam splitter 445*b* transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460*a*-460*f* through one or more of the beam splitters 445*a*-445*g*, the bandpass filters 450*a*-450*e*, the longpass filters 455*a*-455*b*, and the fluorescence collection lens 440.

The fluorescence collection lens 440 collects light emitted from the particle-laser beam interaction and routes that light towards one or more beam splitters and filters. Bandpass filters, such as bandpass filters 450*a*-450*e*, allow a narrow range of wavelengths to pass through the filter. For example, bandpass filter 450*a* is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455*a*-455*b*, transmit wavelengths of light equal to or longer than a specified wavelength of light. For example, longpass filter 455*a*, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445*g* is a 620 SP beam splitter, meaning that the beam splitter 445*g* transmits wavelengths of light that are 620 nm or shorter and reflects wavelengths of light that are longer than 620 nm in a different direction. In one embodiment, the beam splitters 445*a*-445*g* can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460*a*-460*f*. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
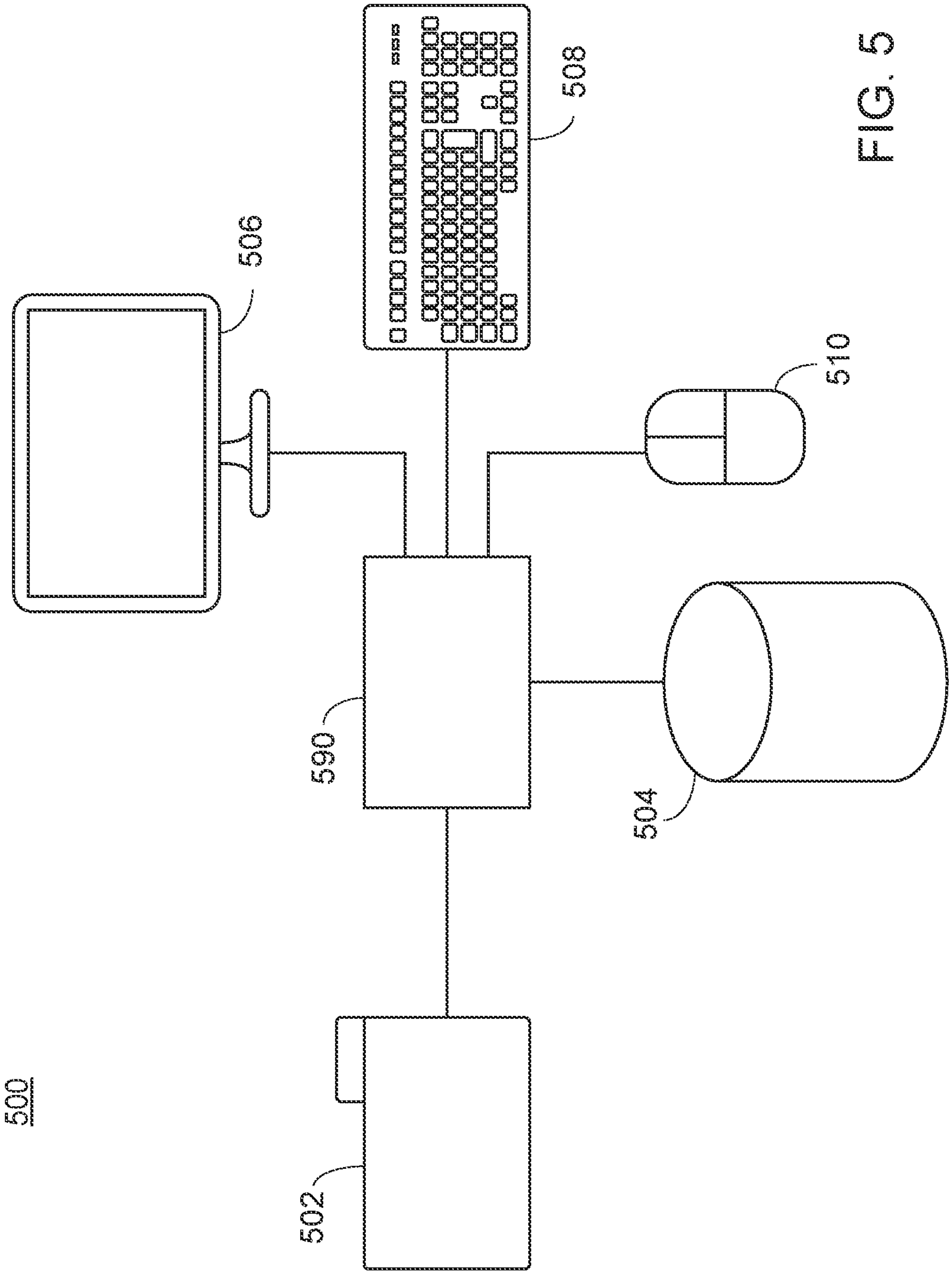
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
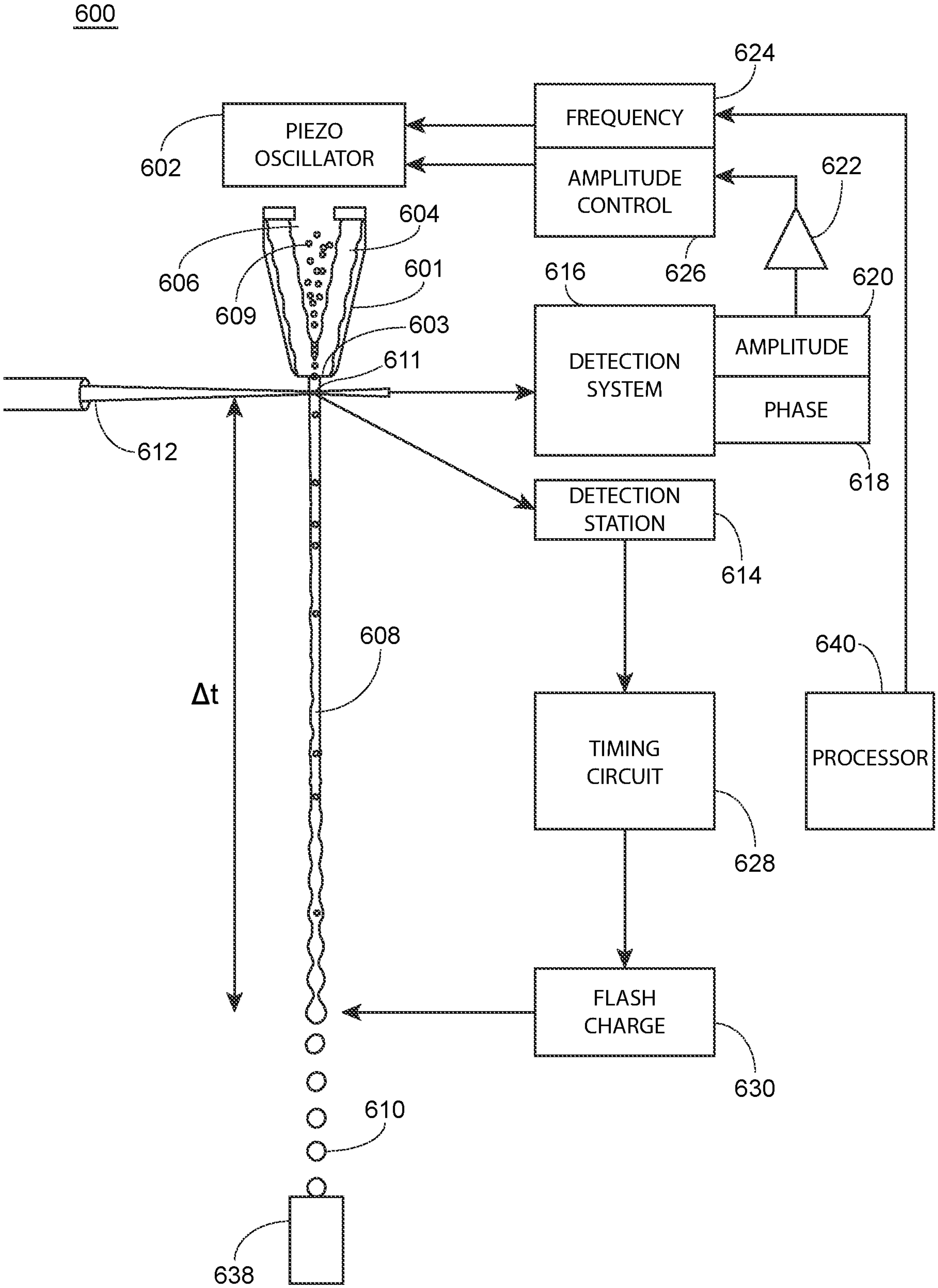
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
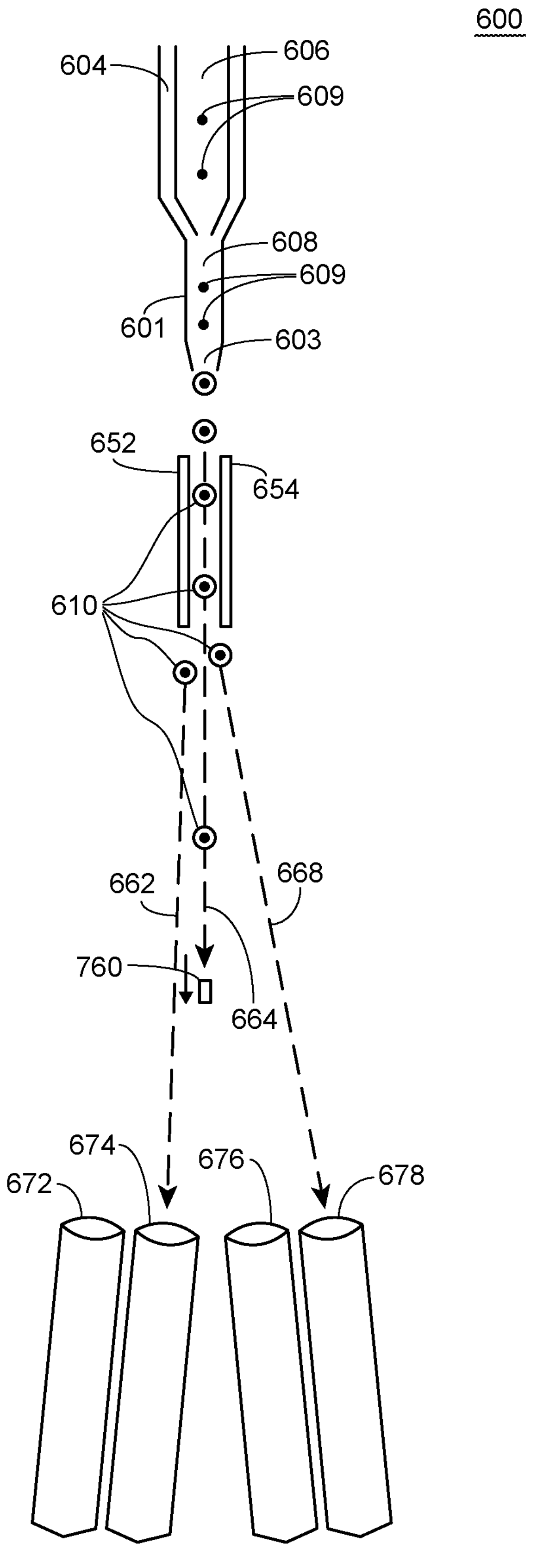
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation of the methods described herein. In some embodiments, systems include a computer having a computer readable storage medium with a computer program stored thereon, where the computer program when loaded on the computer includes instructions for detecting light with a light detection system across a horizontal axis of a flow stream, instructions for generating data signals in an imaging photodetector channel of the light detection system at a plurality of pixel locations across the flow stream and instructions for calculating a detector gain correction factor for each pixel location across the flow stream in response to the generated data signals.

In some instances, the computer program includes instructions for simultaneously detecting light at a plurality of positions across the flow stream. In certain embodiments, the computer program includes instructions for determining an intensity of the generated data signal at each pixel location. In other embodiments, the computer program includes instructions for determining a peak pulse amplitude at each pixel location based on the generated data signals. In other embodiments, the computer program includes instructions for determining a pulse area of the generated data signal at each pixel location. In some embodiments, the computer program includes instructions for applying detector gain correction factors to data signals generated in one or more non-imaging photodetector channels of the light detection system. In some instances, the computer program includes instructions for applying an adjustment to the signal intensity at each pixel location such that the intensity variation between data signals across the flow stream is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less. In some instances, the computer program includes instructions for applying an adjustment to the peak pulse amplitude at each pixel location such that the variation between the peak pulse amplitudes across the flow stream is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less. In some instances, the computer program includes instructions for applying an adjustment to the pulse area of the generated data signal at each pixel location such that the variation between the pulse areas across the flow stream is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less. In certain instances, the computer program includes instructions for determining the variation in signal intensity between the pixel locations across the flow stream, such as by calculating a robust coefficient of variation (rCV) based on the determined data signal intensity at each pixel location. In certain embodiments, the computer program includes instructions for applying the detector gain correction factors to the data signals in the non-imaging photodetector channel so as to reduce the robust coefficient of variation in the non-imaging photodetector data signal intensity across the flow stream by 0.1% or more, such as by 0.2% or more, such as by 0.3% or more, such as by 0.4% or more, such as by 0.5% or more, such as by 0.6% or more, such as by 0.7% or more, such as by 0.8% or more, such as by 0.9% or more, such as by 1.0% or more, such as by 1.5% or more, such as by 2.0% or more and including reducing the robust coefficient of variation in the data signal intensity across the flow stream by 2.5% or more.

In certain embodiments, the computer program includes a detector gain correction factor data file based on the determined detector gain correction factors that is applied to the data signals at each pixel location. In some instances, the data gain correction factor data file is stored in the computer program as a table of detector gain correction factors at each pixel location.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 7:
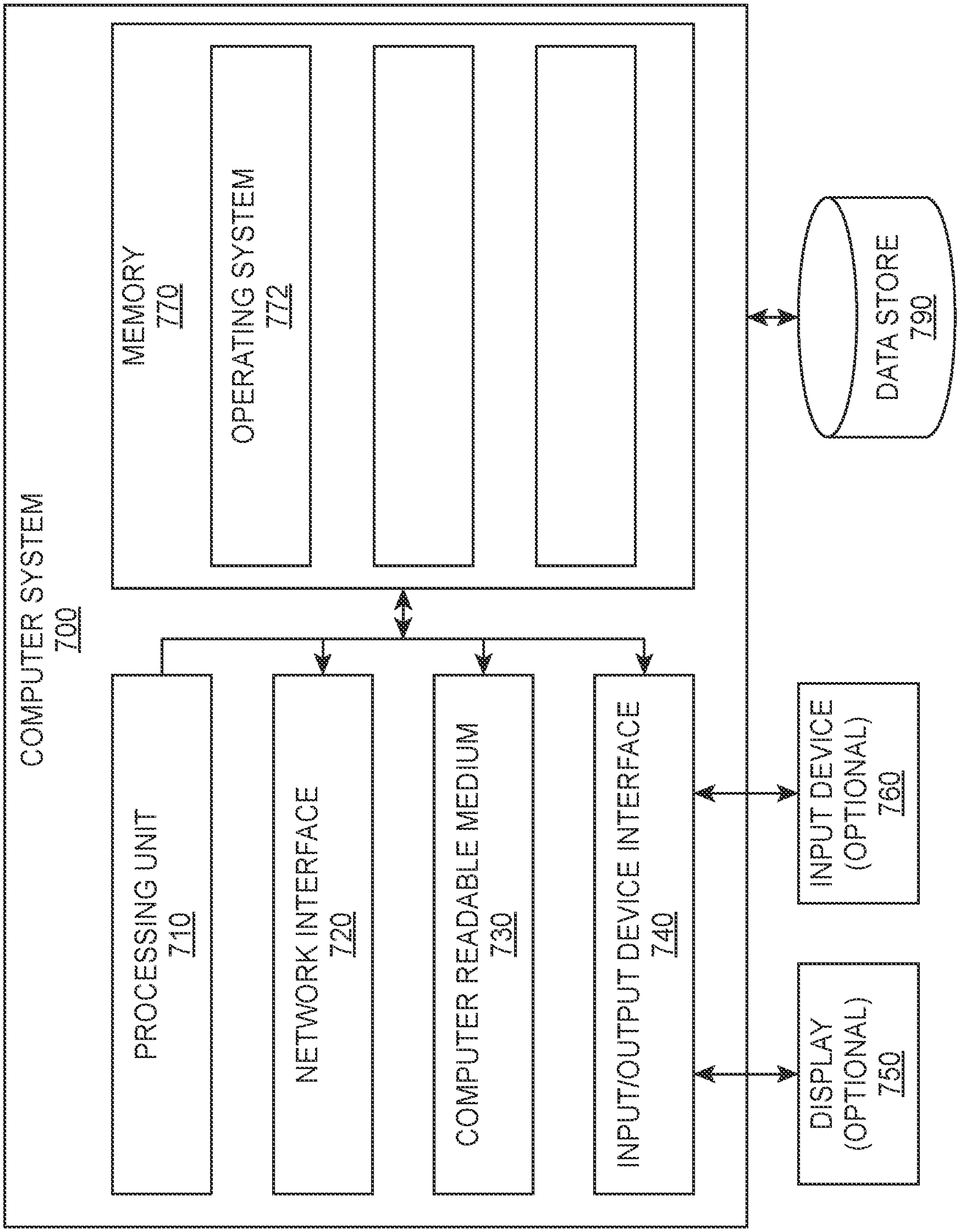
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-ft magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having algorithm for detecting light with a light detection system across a horizontal axis of a flow stream, algorithm for generating data signals in an imaging photodetector channel of the light detection system at a plurality of pixel locations across the flow stream and algorithm for calculating a detector gain correction factor for each pixel location across the flow stream in response to the generated data signals. In some instances, the non-transitory computer readable storage medium includes algorithm for simultaneously detecting light at a plurality of positions across the flow stream.

In certain embodiments, the non-transitory computer readable storage medium includes algorithm for determining an intensity of the generated data signal at each pixel location. In other embodiments, the non-transitory computer readable storage medium includes algorithm for determining a peak pulse amplitude at each pixel location based on the generated data signals. In other embodiments, the non-transitory computer readable storage medium includes algorithm for determining a pulse area of the generated data signal at each pixel location. In certain instances, the non-transitory computer readable storage medium includes algorithm for plotting one or more of the signal intensity, peak amplitude and pulse area of the generated data signals at each pixel location. In some embodiments, the non-transitory computer readable storage medium includes algorithm for assessing the variation of the signal intensity, peak amplitude or pulse area of the generated data signals across the horizontal axis of the flow stream. In certain embodiments, the non-transitory computer readable storage medium includes algorithm for calculating a robust coefficient of variation of one or more of the signal intensity, peak amplitude or pulse area of the generated data signals across the flow stream. For example, the robust coefficient of variation of the data signal intensity may be calculated based on the plotted data signals at each pixel location.

In some embodiments, the non-transitory computer readable storage medium includes algorithm for calculating a detector gain correction factor for each pixel location in the imaging photodetector channel based on the generated data signals across the flow stream. In some embodiments, the detector gain correction factor is calculated by determining an adjustment to the signal intensity at each pixel location such that there is little to no intensity variation between data signals across the flow stream. For example, the detector gain correction factor may be an adjustment to the signal intensity at each pixel location such that the intensity variation between data signals across the flow stream is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less. In some embodiments, the non-transitory computer readable storage medium includes algorithm for applying the detection gain correction factor to the generated data signals in the imaging photodetector channel at each pixel location so as to reduce the robust coefficient of variation (rCV) in the data signal intensity across the flow stream by 0.1% or more, such as by 0.2% or more, such as by 0.3% or more, such as by 0.4% or more, such as by 0.5% or more, such as by 0.6% or more, such as by 0.7% or more, such as by 0.8% or more, such as by 0.9% or more, such as by 1.0% or more, such as by 1.5% or more, such as by 2.0% or more and including reducing the robust coefficient of variation in the data signal intensity across the flow stream by 2.5% or more.

In some embodiments, the non-transitory computer readable storage medium includes algorithm for applying detector gain correction factors to data signals generated in one or more non-imaging photodetector channels of the light detection system. In some instances, the non-transitory computer readable storage medium includes algorithm for calculating gain correction factors for data signals generated in one or more non-imaging photodetector channels based on gain correction factors from the imaging photodetector channel and signal intensities from the non-imaging photodetector channels. For example, the non-transitory computer readable storage medium includes algorithm for applying the determined detector gain correction factors to data signals generated in 2 or more non-imaging photodetector channels, such as 3 or more, such as 4 or more, such as 8 or more, such as 12 or more, such as 16 or more, such as 24 or more, such as 32 or more, such as 48 or more, such as 64 or more and including in 128 or more non-imaging photodetector channels of the light detection system. In these embodiments, the non-transitory computer readable storage medium includes algorithm for applying detector gain correction factors so as to generate data signals in the non-imaging photodetector channels that exhibit little to no signal intensity variation across the flow stream, such as where intensity variation in the data signals across the flow stream in each non-imaging photodetector channel is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less.

In certain embodiments, the non-transitory computer readable storage medium includes algorithm for generating a detector gain correction factor data file based on the determined detector gain correction factors at each pixel location. In some instances, the data gain correction factor data file includes a table of detector gain correction factors at each pixel location determined from the imagining photodetector channel. In some instances, the non-transitory computer readable storage medium includes algorithm for applying the detector gain correction factor data file to one or more stored sets of data signals, such as data signals stored in memory.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Integrated Circuit Devices

Aspects of the present disclosure also include integrated circuit devices having programming for practicing the subject methods according to certain embodiments. In some embodiments, integrated circuit devices of interest include a field programmable gate array (FPGA). In other embodiments, integrated circuit devices include an application specific integrated circuit (ASIC). In yet other embodiments, integrated circuit devices include a complex programmable logic device (CPLD). In some embodiments, the integrated circuit includes programming for applying detector gain correction factors to data signals generated in one or more non-imaging photodetector channels of the light detection system. In some instances, the integrated circuit includes programming for calculating gain correction factors for data signals generated in one or more non-imaging photodetector channels based on a gain correction factor from the imaging photodetector channel and signal intensities from the non-imaging photodetector channels. For example, the integrated circuit devices include programming for applying detector gain correction factors to data signals generated in 2 or more non-imaging photodetector channels, such as 3 or more, such as 4 or more, such as 8 or more, such as 12 or more, such as 16 or more, such as 24 or more, such as 32 or more, such as 48 or more, such as 64 or more and including in 128 or more non-imaging photodetector channels of the light detection system. In these embodiments, the integrated circuit devices include programming for applying detector gain correction factors so as to generate data signals in the non-imaging photodetector channels that exhibit little to no signal intensity variation across the flow stream, such as where intensity variation in the data signals across the flow stream in each non-imaging photodetector channel is 10% or less, such as 9% or less, such as 8% or less, such as 7% or less, such as 6% or less, such as 5% or less, such as 4% or less, such as 3% or less, such as 2% or less, such as 1% or less, such as 0.5% or less, such as 0.1% or less, such as 0.05% or less, such as 0.01% or less and including 0.001% or less.

In certain embodiments, the integrated circuit devices include programming for applying detector gain correction factors at each pixel location from a detector gain correction factor data file. In some instances, the data gain correction factor data file includes a table of detector gain correction factors at each pixel location determined from the imagining photodetector channel. In some instances, the integrated circuit devices include programming for applying the detector gain correction factor data file to one or more stored sets of data signals, such as data signals stored in memory.

Kits

Aspects of the present disclosure further include kits, where kits include one or more of the components of light detection systems described herein. In some embodiments, kits include a plurality of photodetectors and programming for the subject systems, such as in the form of a computer readable medium (e.g., flash drive, USB storage, compact disk, DVD, Blu-ray disk, etc.) or instructions for downloading the programming from an internet web protocol or cloud server. Kits may also include an optical adjustment component, such as lenses, mirrors, filters, fiber optics, wavelength separators, pinholes, slits, collimating protocols and combinations thereof.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Multispectral Fluorescent Particles

As described above, the subject methods include in some embodiments irradiating a particle in a flow stream. In some instances, the irradiated particles in the flow stream are particles (e.g., beads) having one or more fluorophores. Particles of interest according to certain embodiments may include a single-peak multi-fluorophore bead that provides for a bright photodetector signal across all light source wavelengths (e.g., across all LEDs or lasers of the system) and across detection wavelengths of the photodetectors.

In embodiments, the subject particles are formulated (e.g., in a fluidic composition) for flowing in a flow stream irradiated by a light source as described above. Each particle may have one or more different types of fluorophores, such as 2 or more, or 3 or more, or 4 or more, or 5 or more, or 6 or more, or 7 or more, or 8 or more, or 9 or more, or 10 or more, or 11 or more, or 12 or more, or 13 or more, or 14 or more, or 15 or more, 16 or more, or 17 or more, or 18 or more, or 19 or more, or 20 or more, or 25 or more, or 30 or more, or 35 or more, or 40 or more, or 45 or more, 50 or more different types of fluorophores. For example, each particle may include 2, or 3, or 4, or 5, or 6, or 7, or 8, or 9, or 10, or 11, or 12, or 13, or 14, or 15, or 16, or 17, or 18, or 19, or 20 different types of fluorophores.

In embodiments, each fluorophore is stably associated with the particle. By stably associated is meant that the fluorophore does not readily dissociate from the particle to contact with a liquid medium, e.g., an aqueous medium. In some embodiments, one or more of the fluorophores are covalently conjugated to the particle. In other embodiments, one or more of the fluorophores are physically associated (i.e., non-covalently coupled) to the particle. In other embodiments, one or more fluorophores are covalently conjugated to the particle and one or more fluorophores are physically associated with the particle.

In some embodiments, each particle includes 2 or more different types of fluorophores. Any two fluorophores are considered to be different a distinct if they differ from each other by one or more of molecular formula, excitation maximum and emission maximum. As such, different or distinct fluorophores may differ from each other in terms of chemical composition or in terms of one or more properties of the fluorophore. For instance, different fluorphores may differ from each other by at least one of excitation maxima and emission maxima. In some cases, different fluorophores differ from each other by their excitation maxima. In some cases, different fluorophores differ from each other by their emission maxima. In some cases, different fluorophores differ from each other by both their excitation maxima and emission maxima. As such, in embodiments that include first and second fluorophores, the first and second fluorophore may differ from each other by at least one of excitation maxima and emission maxima. For example, the first and second fluorophore may differ from each other by excitation maxima, by emission maxima, or by both excitation and emission maxima. A given set of fluorophores may be considered distinct if they differ from each other in terms of excitation or emission maximum, where the magnitude of such difference is, in some instances, 5 nm or more, such 10 nm or more, including 15 nm or more, wherein in some instances the magnitude of the difference ranges from 5 to 400 nm, such as 10 to 200 nm, including 15 to 100 nm, such as 25 to 50 nm.

Fluorophores of interest according to certain embodiments have excitation maxima that range from 100 nm to 800 nm, such as from 150 nm to 750 nm, such as from 200 nm to 700 nm, such as from 250 nm to 650 nm, such as from 300 nm to 600 nm and including from 400 nm to 500 nm. Fluorophores of interest according to certain embodiments have emission maxima that range from 400 nm to 1000 nm, such as from 450 nm to 950 nm, such as from 500 nm to 900 nm, such as from 550 nm to 850 nm and including from 600 nm to 800 nm. In certain instances, the fluorophore is a light emitting dye such as a fluorescent dye having a peak emission wavelength of 200 nm or more, such as 250 nm or more, such as 300 nm or more, such as 350 nm or more, such as 400 nm or more, such as 450 nm or more, such as 500 nm or more, such as 550 nm or more, such as 600 nm or more, such as 650 nm or more, such as 700 nm or more, such as 750 nm or more, such as 800 nm or more, such as 850 nm or more, such as 900 nm or more, such as 950 nm or more, such as 1000 nm or more and including 1050 nm or more. For example, the fluorophore may be a fluorescent dye having a peak emission wavelength that ranges from 200 nm to 1200 nm, such as from 300 nm to 1100 nm, such as from 400 nm to 1000 nm, such as from 500 nm to 900 nm and including a fluorescent dye having a peak emission wavelength of from 600 nm to 800 nm. In certain embodiments, the subject multispectral particles provide for stable excitation by lasers which irradiate at a wavelength at or about 349 nm (UV laser), 488 nm (blue laser), 532 nm (Nd:YAG solid state laser), 640 nm (red laser) and 405 nm (violet laser). In certain instances, the subject multispectral particles provide for stable excitation by a light source across a full spectral detection band, such as from 350 nm to 850 nm.

In some instances, each particle includes a fluorophore which emits fluorescence in response to irradiation by the light source. In some embodiments, fluorophores of interest may include but are not limited to dyes suitable for use in analytical applications (e.g., flow cytometry, imaging, etc.), such as an acridine dye, anthraquinone dyes, arylmethane dyes, diarylmethane dyes (e.g., diphenyl methane dyes), chlorophyll containing dyes, triarylmethane dyes (e.g., triphenylmethane dyes), azo dyes, diazonium dyes, nitro dyes, nitroso dyes, phthalocyanine dyes, cyanine dyes, asymmetric cyanine dyes, quinon-imine dyes, azine dyes, eurhodin dyes, safranin dyes, indamins, indophenol dyes, fluorine dyes, oxazine dye, oxazone dyes, thiazine dyes, thiazole dyes, xanthene dyes, fluorene dyes, pyronin dyes, fluorine dyes, rhodamine dyes, phenanthridine dyes, as well as dyes combining two or more of the aforementioned dyes (e.g., in tandem), polymeric dyes having one or more monomeric dye units and mixtures of two or more of the aforementioned dyes thereof. A large number of dyes are commercially available from a variety of sources, such as, for example, Molecular Probes (Eugene, OR), Dyomics GmbH (Jena, Germany), Sigma-Aldrich (St. Louis, MO), Sirigen, Inc. (Santa Barbara, CA) and Exciton (Dayton, OH). For example, the fluorophore may include 4-acetamido-4'-isothiocyanatostilbene-2,2'disulfonic acid; acridine and derivatives such as acridine, acridine orange, acridine yellow, acridine red, and acridine isothiocyanate; allophycocyanin, phycoerythrin, peridinin-chlorophyll protein, 5-(2'-aminoethyl)aminonaphthalene-1-sulfonic acid (EDANS); 4-amino-N-[3-vinylsulfonyl)phenyl]naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5', 5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; [5-dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl)aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein, and QFITC (XRITC); fluorescamine; IR144; IR1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene; dye-conjugated polymers (i.e., polymer-attached dyes) such as fluorescein isothiocyanate-dextran as well as dyes combining two or more dyes (e.g., in tandem), polymeric dyes having one or more monomeric dye units and mixtures of two or more of the aforementioned dyes or combinations thereof.

In some instances, the fluorophore is polymeric dye. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Polymeric dyes of interest include, but are not limited to, those dyes described by Gaylord et al. in U.S. Publication Nos. 20040142344, 20080293164, 20080064042, 20100136702, 20110256549, 20110257374, 20120028828, 20120252986, 20130190193, 20160264737, 20160266131, 20180231530, 20180009990, 20180009989, and 20180163054, the disclosures of which are herein incorporated by reference in their entirety; and Gaylord et al., J. Am. Chem. Soc., 2001, 123(26), pp 6417-6418; Feng et al., Chem. Soc. Rev., 2010,39, 2411-2419; and Traina et al., J. Am. Chem. Soc., 2011, 133 (32), pp 12600-12607, the disclosures of which are herein incorporated by reference in their entirety.

The polymeric dye may have one or more desirable spectroscopic properties, such as a particular absorption maximum wavelength, a particular emission maximum wavelength, extinction coefficient, quantum yield, and the like (see e.g., Chattopadhyay et al., "Brilliant violet fluorophores: A new class of ultrabright fluorescent compounds for immunofluorescence experiments." Cytometry Part A, 81A (6), 456-466, 2012). In some embodiments, the polymeric dye has an absorption curve between 280 nm and 475 nm. In certain embodiments, the polymeric dye has an absorption maximum (excitation maximum) in the range 280 nm and 475 nm. In some embodiments, the polymeric dye absorbs incident light having a wavelength in the range between 280 nm and 475 nm. In some embodiments, the polymeric dye has an emission maximum wavelength ranging from 400 nm to 850 nm, such as 415 nm to 800 nm, where specific examples of emission maxima of interest include, but are not limited to: 421 nm, 510 nm, 570 nm, 602 nm, 650 nm, 711 nm and 786 nm. In some instances, the polymeric dye has an emission maximum wavelength in a range selected from the group consisting of 410 nm to 430 nm, 500 nm to 520 nm, 560 nm to 580 nm, 590 nm to 610 nm, 640 nm to 660 nm, 700 nm to 720 nm, and 775 nm to 795 nm. In certain embodiments, the polymeric dye has an emission maximum wavelength of 421 nm. In some instances, the polymeric dye has an emission maximum wavelength of 510 nm. In some cases, the polymeric dye has an emission maximum wavelength of 570 nm. In certain embodiments, the polymeric dye has an emission maximum wavelength of 602 nm. In some instances, the polymeric dye has an emission maximum wavelength of 650 nm. In certain cases, the polymeric dye has an emission maximum wavelength of 711 nm. In some embodiments, the polymeric dye has an emission maximum wavelength of 786 nm. In certain instances, the polymeric dye has an emission maximum wavelength of 421 nm±5 nm. In some embodiments, the polymeric dye has an emission maximum wavelength of 510 nm±5 nm. In certain instances, the polymeric dye has an emission maximum wavelength of 570 nm±5 nm. In some instances, the polymeric dye has an emission maximum wavelength of 602 nm±5 nm. In some embodiments, the polymeric dye has an emission maximum wavelength of 650 nm±5 nm. In certain instances, the polymeric dye has an emission maximum wavelength of 711 nm±5 nm. In some cases, the polymeric dye has an emission maximum wavelength of 786 nm±5 nm. In certain embodiments, the polymeric dye has an emission maximum selected from the group consisting of 421 nm, 510 nm, 570 nm, 602 nm, 650 nm, 711 nm and 786 nm.

Specific polymeric dyes that may be employed include, but are not limited to, BD Horizon Brilliant™ Dyes, such as BD Horizon Brilliant™ Violet Dyes (e.g., BV421, BV510, BV605, BV650, BV711, BV786); BD Horizon Brilliant™ Ultraviolet Dyes (e.g., BUV395, BUV496, BUV737, BUV805); and BD Horizon Brilliant™ Blue Dyes (e.g., BB515) (BD Biosciences, San Jose, CA).

The particles may be any convenient shape for irradiating by the light source as described above. In some instances the particle is a solid support that is shaped or configured as discs, spheres, ovates, cubes, blocks, cones, etc., as well as irregular shapes. The mass of the particles may vary, ranging in some instances from 0.01 mg to 20 mg, such as from 0.05 mg to 19.5 mg, such as from 0.1 mg to 19 mg, such as from 0.5 mg to 18.5 mg, such as from 1 mg to 18 mg, such as from 1.5 mg to 17.5 mg, such as from 2 mg to 15 mg and including from 3 mg to 10 mg. The particle may have a surface area of 0.01 $mm^2$ or more, such as 0.05 $mm^2$ or more, such as 0.1 $mm^2$ or more, such as 0.5 $mm^2$ or more, such as 1 $mm^2$ or more, such as 1.5 $mm^2$ or more, such as 2 $mm^2$ or more, such as 2.5 $mm^2$ or more, such as 3 $mm^2$ or more, such as 3.5 $mm^2$ or more, such as 4 $mm^2$ or more, such as 4.5 $mm^2$ or more and including 5 $mm^2$ or more, e.g., as determined using a Vertex system or equivalent.

The dimensions of the particles may vary, as desired, where in some instances, particles have a longest dimension ranging from 0.01 mm to 10 mm, such as from 0.05 mm to 9.5 mm, such as from 0.1 mm to 9 mm, such as from 0.5 mm to 8.5 mm, such as from 1 mm to 8 mm, such as from 1.5 mm to 7.5 mm, such as from 2 mm to 7 mm, such as from 2.5 mm to 6.5 mm and including from 3 mm to 6 mm. In certain instances, particles have a shortest dimension ranging from 0.01 mm to 5 mm, such as from 0.05 mm to 4.5 mm, such as from 0.1 mm to 4 mm, such as from 0.5 mm to 3.5 mm and including from 1 mm to 3 mm.

In certain instances, particles of interest are porous, such as where the particles have a porosity ranging from 5μ to 100μ, such as from 10μ to 90μ, such as from 15μ to 85μ, such as from 20μ to 80μ, such as from 25μ to 75μ and including from 30μ to 70μ, for instance 50μ as determined for example using a Capillary Flow Porometer or equivalent.

The particles may be form from any convenient material. Of interest in some embodiments are particles, e.g., beads, having low or no auto-fluorescence. Suitable materials include, but are not limited to, glass materials (e.g., silicates), ceramic materials (e.g., calcium phosphates), metallic materials, and polymeric materials, etc. such as for example, polyethylene, polypropylene, polytetrafluoroethylene, polyvinylidine fluoride, and the like. In some instances, the particles are formed from a solid support, such as the porous matrices as described in U.S. Published Application Publication No. U.S. Pat. No. 9,797,899, the disclosure of which is herein incorporated by reference. As such, a surface area of the particle may be any suitable macroporous or microporous substrate, where suitable macroporous and microporous substrates include, but are not limited to, ceramic matrices, frits, such as fritted glass, polymeric matrices as well as metal-organic polymeric matrices. In some embodiments, the porous matrix is a frit. The term "frit" is used herein in its conventional sense to refer to the porous composition formed from a sintered granulated solid, such as glass. Frits may have a chemical constituent which vary, depending on the type of sintered granulate used to prepare the frit, where frits that may be employed include, but are not limited to, frits composed of aluminosilicate, boron trioxide, borophosphosilicate glass, borosilicate glass, ceramic glaze, cobalt glass, cranberry glass, fluorophosphate glass, fluorosilicate glass, fuzed quartz, germanium dioxide, metal and sulfide embedded borosilicate, leaded glass, phosphate glass, phosphorus pentoxide glass, phosphosilicate glass, potassium silicate, soda-lime glass, sodium hexametaphosphate glass, sodium silicate, tellurite glass, uranium glass, vitrite and combinations thereof. In some embodiments, the porous matrix is a glass frit, such as a borosilicate, aluminosilicate, fluorosilicate, potassium silicate or borophosphosilicate glass frit.

In some embodiments, the particle is formed from a porous organic polymer. Porous organic polymers of interest vary depending on the sample volume, components in the sample as well as assay reagent present and may include but are not limited to porous polyethylene, polypropylene, polytetrafluoroethylene (PTFE), polyvinylidene fluoride (PVDF), ethyl vinyl acetate (EVA), polycarbonate, polycarbonate alloys, polyurethane, polyethersulfone, copolymers and combinations thereof. For example, porous polymers of interest include homopolymers, heteropolymers and copolymers composed of monomeric units such as styrene, monoalkylene allylene monomers such as ethyl styrene, a-methyl styrene, vinyl toluene, and vinyl ethyl benzene; (meth)acrylic esters such as methyl(meth)acrylate, ethyl (meth)acrylate, butyl(meth)acrylate, isobutyl(meth)acrylate, isodecyl(meth)acrylate, 2-ethylhexyl (meth)acrylate, lauryl (meth)acrylate, stearyl(meth)acrylate, cyclohexyl(meth) acrylate, and benzyl(meth)acrylate; chlorine-containing monomers such as vinyl chloride, vinylidenechloride, and chloromethylstyrene; acrylonitrile compounds such as acrylonitrile and methacrylonitrile; and vinyl acetate, vinyl propionate, n-octadecyl acrylamide, ethylene, propylene, and butane, and combinations thereof.

In some embodiments, the particles are formed from a metal organic polymer matrix, for example an organic polymer matrix that has a backbone structure that contains a metal such as aluminum, barium, antimony, calcium, chromium, copper, erbium, germanium, iron, lead, lithium, phosphorus, potassium, silicon, tantalum, tin, titanium, vanadium, zinc or zirconium. In some embodiments, the porous metal organic matrix is an organosiloxane polymer including but not limited to polymers of methyltrimethoxysilane, dimethyldimethoxysilane, tetraethoxysilane, methacryloxypropyltrimethoxysilane, bis(triethoxysilyl)ethane, bis(triethoxysilyl)butane, bis(triethoxysilyl)pentane, bis(triethoxysilyl)hexane, bis(triethoxysilyl)heptane, bis(triethoxysilyl)octane, and combinations thereof.

Utility

The subject methods, systems and computer systems find use in a variety of applications where it is desirable to calibrate or optimize the photodetectors of a light detection system. The subject methods and systems also find use for light detection systems having a plurality of photodetectors that are used to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 350 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for determining a detector gain correction factor for application to flow cytometer data, the method comprising:

detecting light with a light detection system from one or more laser beams irradiating across a horizontal axis of a flow stream perpendicular to the flow direction of the flow stream, the flow stream consisting of a single fluid column configured to move a single stream of particles across each laser beam along a common flow path;

generating, for an imaging laser beam of the one or more laser beams, data signals in an imaging photodetector channel of the light detection system at a plurality of pixel locations, each pixel location corresponding to a different position across the horizontal axis of the flow stream irradiated by the one or more laser beams; and calculating a detector gain correction factor for each pixel location across the flow stream in response to the generated data signals, the detector gain correction factor comprising an adjustment to signal intensity of data signals generated in a photodetector channel for the pixel location such that intensity variation in the data signals of the photodetector channel across the flow stream is 10% or less;

thereby determining a detector gain correction factor for application to flow cytometer data.

2. The method according to claim 1, wherein the method comprises determining, from the generated data signals in the imaging photodetector channel, at each pixel location across the flow stream one or more of:

a signal intensity;

a peak pulse amplitude; or a pulse area.

3. The method according to claim 2, wherein the method further comprises calculating a robust coefficient of variation (rCV) based on the determined data signal intensity at each pixel location across the flow stream.

4. The method according to claim 1, wherein the method comprises:

generating, for a non-imaging laser beam of the one or more laser beams, data signals in a non-imaging photodetector channel of the light detection system for each of the plurality of pixel locations of the imaging photodetector channel; and calculating, for application to data signals generated in the non-imaging photodetector channel, a detector gain correction factor for each pixel location across the flow stream in response to the generated data signals, the detector gain correction factor comprising an adjustment to signal intensity of data signals generated in the non-imaging photodetector channel for the pixel location such that intensity variation in the data signals of the non-imaging photodetector channel across the flow stream is 10% or less.

5. The method according to claim 4, wherein the method comprises determining, from the generated data signals in the non-imaging photodetector channel, at each pixel location one or more of:

a signal intensity;

a peak pulse amplitude; or a pulse area.

6. The method according to claim 5, wherein the method further comprises calculating a robust coefficient of variation (rCV) based on the determined data signal intensity at each pixel location.

7. The method according to claim 1, wherein the method further comprises generating a detector gain correction factor data file comprising the calculated detector gain correction factors for each pixel location.

8. The method according to claim 7, wherein the method further comprises applying the calculated detector gain correction factor for each pixel location across the flow stream to data signals generated in one or more non-imaging photodetector channels of the light detection system each corresponding to a non-imaging laser beam.

9. The method according to claim 1, wherein the detector gain correction factor for each pixel location across the flow stream is calculated on an integrated circuit.

10. The method according to claim 9, wherein the integrated circuit comprises a field programmable gate array (FPGA).

11. A particle analyzer comprising:

a light detection system comprising an imaging photodetector, wherein the light detection system is configured to:

detect light from one or more laser beams irradiating across a horizontal axis of a flow stream perpendicular to the flow direction of the flow stream, the flow stream consisting of a single fluid column configured to move a single stream of particles across each laser beam along a common flow path;

generate, for an imaging laser beam of the one or more laser beams, data signals in an imaging photodetector channel of the light detection system at a plurality of pixel locations, each pixel location corresponding to a different position across the horizontal axis of the flow stream irradiated by the one or more laser beams; and a processor comprising memory operably coupled to the processor wherein the memory comprises instructions stored thereon, which when executed by the processor, cause the processor to calculate a detector gain correction factor for each pixel location across the flow stream in response to the generated data signals, the detector gain correction factor comprising an adjustment to signal intensity of data signals generated in a photodetector channel for the pixel location such that intensity variation in the data signals of the photodetector channel across the flow stream is 10% or less.

12. The particle analyzer according to claim 11, wherein the memory comprises instructions for determining, from the generated data signals in the imaging photodetector channel, at each pixel location across the flow stream one or more of:

a signal intensity;

a peak pulse amplitude; or a pulse area.

13. The particle analyzer according to claim 11, wherein the memory comprises instructions for calculating a robust coefficient of variation (rCV) based on the determined data signal intensity at each pixel location across the flow stream.

14. The particle analyzer according to claim 11, wherein the light detection system comprises a photodetector optically coupled to a slit comprising a plurality of openings and is configured to generate data signals in a plurality of photodetector channels in response to light detected between each of the plurality of openings in the slit.

15. The particle analyzer according to claim 11, wherein the light detection system is configured to generate, for a non-imaging laser beam of the one or more laser beams, data signals in a non-imaging photodetector channel of the light detection system for each of the plurality of pixel locations of the imaging photodetector channel; and the memory includes instructions for calculating, for application to data signals generated in the non-imaging photodetector channel, a detector gain correction factor for each pixel location across the flow stream in response to the generated data signals, the detector gain correction factor comprising an adjustment to signal intensity of data signals generated in the non-imaging photodetector channel for the pixel location such that intensity variation in the data signals of the non-imaging photodetector channel across the flow stream is 10% or less.

16. The particle analyzer according to claim 15, wherein the memory comprises instructions for determining, from the generated data signals in the non-imaging photodetector channel, at each pixel location one or more of:

a signal intensity;

a peak pulse amplitude; or a pulse area.

17. The particle analyzer according to claim 16, wherein the memory comprises instructions for calculating a robust coefficient of variation (rCV) based on the determined data signal intensity at each pixel location.

18. The particle analyzer according to claim 11, wherein the memory comprises instructions for generating a detector gain correction factor data file comprising the calculated detector gain correction factors for each pixel location.

19. The particle analyzer according to claim 18, wherein the memory comprises instructions for applying the calculated detector gain correction factor for each pixel location across the flow stream to data signals generated in one or more non-imaging photodetector channels of the light detection system each corresponding to a non-imaging laser beam.

20. A non-transitory computer readable storage medium comprising instructions stored thereon for determining a detector gain correction factor for application to flow cytometer data, the instructions comprising:

algorithm for detecting light with a light detection system from one or more laser beams irradiating across a horizontal axis of a flow stream perpendicular to the flow direction of the flow stream, the flow stream consisting of a single fluid column configured to move a single stream of particles across each laser beam along a common flow path;

algorithm for generating, for an imaging laser beam of the one or more laser beams, data signals in an imaging photodetector channel of the light detection system at a plurality of pixel locations, each pixel location corresponding to a different position across the horizontal axis of the flow stream irradiated by the one or more laser beams; and algorithm for calculating a detector gain correction factor for each pixel location across the flow stream in response to the generated data signals, the detector gain correction factor comprising an adjustment to signal intensity of data signals generated in a photodetector channel for the pixel location such that intensity variation in the data signals of the photodetector channel across the flow stream is 10% or less.

* * * * *